United States Patent
Muntz et al.

(10) Patent No.: US 8,838,605 B2
(45) Date of Patent: *Sep. 16, 2014

(54) METHODS AND APPARATUS FOR DISTRIBUTED COMMUNITY FINDING

(71) Applicant: Netseer, Inc., Santa Clara, CA (US)

(72) Inventors: Alice Hwei-Yuan Meng Muntz, Pacific Palisades, CA (US); Behnam Attaran Rezaei, Santa Clara, CA (US)

(73) Assignee: Netseer, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/660,940

(22) Filed: Oct. 25, 2012

(65) Prior Publication Data

US 2013/0046797 A1 Feb. 21, 2013

Related U.S. Application Data

(63) Continuation of application No. 13/098,870, filed on May 2, 2011, now Pat. No. 8,301,617, which is a continuation of application No. 11/125,329, filed on May 10, 2005, now Pat. No. 7,958,120.

(51) Int. Cl.
*G06F 17/30* (2006.01)
*G06Q 10/00* (2012.01)

(52) U.S. Cl.
CPC ............. *G06Q 10/00* (2013.01); *Y10S 707/959* (2013.01); *Y10S 707/93* (2013.01); *Y10S 707/937* (2013.01)
USPC ........... 707/737; 707/770; 707/930; 707/937; 707/959

(58) Field of Classification Search
CPC ............. G06F 17/30011; G06F 17/30864; G06F 17/30722; G06F 17/30643; G06F 17/30705; G06F 17/3071
USPC .................. 707/805, 923, 930, 736, 924, 937
See application file for complete search history.

(56) References Cited

U.S. PATENT DOCUMENTS 5,581,764 A   12/1996   Fitzgerald et al.
5,721,910 A * 2/1998   Unger et al. ................... 707/929
(Continued)

FOREIGN PATENT DOCUMENTS

CN   101278257   10/2008
EP   1891509    2/2008
(Continued)

OTHER PUBLICATIONS

Jiang et. al., Monotone Percolation and the Topology Control of Wireless Networks, 2005, IEEE, pp. 327-338.*

(Continued)

*Primary Examiner* — Christyann Pulliam
*Assistant Examiner* — Rezwanul Mahmood
(74) *Attorney, Agent, or Firm* — Nixon Peabody LLP

(57) ABSTRACT

Methods and apparatus for a new approach to the problem of finding communities in complex networks relating to a social definition of communities and percolation are disclosed. Instead of partitioning the graph into separate subgraphs from top to bottom a local algorithm (communities of each vertex) allows overlapping of communities. The performance of an algorithm on synthetic, randomly-generated graphs and real-world networks is used to benchmark this method against others. An heuristic is provided to generate a list of communities for networks using a local community finding algorithm. Unlike diffusion based algorithms, The provided algorithm finds overlapping communities and provides a means to measure confidence in community structure. It features locality and low complexity for exploring the communities for a subset of network nodes, without the need for exploring the whole graph.

60 Claims, 34 Drawing Sheets

(56) References Cited

U.S. PATENT DOCUMENTS

| | | | |
|---|---|---|---|
| 5,956,708 | A | 9/1999 | Dyko et al. |
| 6,038,560 | A | 3/2000 | Wical |
| 6,098,064 | A | 8/2000 | Pirolli et al. |
| 6,233,575 | B1 | 5/2001 | Agrawal et al. |
| 6,242,273 | B1 | 6/2001 | Goodwin et al. |
| 6,339,767 | B1* | 1/2002 | Rivette et al. ............... 707/924 |
| 6,397,682 | B2 | 6/2002 | Kumar et al. |
| 6,446,061 | B1* | 9/2002 | Doerre et al. ............... 707/738 |
| 6,544,357 | B1 | 4/2003 | Hehmann et al. |
| 6,549,896 | B1 | 4/2003 | Candan et al. |
| 6,665,837 | B1 | 12/2003 | Dean et al. |
| 6,826,553 | B1 | 11/2004 | DaCosta et al. |
| 6,886,129 | B1 | 4/2005 | Raghavan et al. |
| 7,031,308 | B2 | 4/2006 | Garcia-Luna-Aceves et al. |
| 7,051,023 | B2 | 5/2006 | Kapur et al. |
| 7,092,953 | B1* | 8/2006 | Haynes ............... 707/923 |
| 7,181,438 | B1* | 2/2007 | Szabo ............... 707/999.002 |
| 7,269,253 | B1 | 9/2007 | Wu et al. |
| 7,483,711 | B2 | 1/2009 | Burchfiel |
| 7,590,589 | B2 | 9/2009 | Hoffberg |
| 7,613,851 | B2 | 11/2009 | Rice et al. |
| 7,660,855 | B2 | 2/2010 | Arning et al. |
| 7,680,796 | B2 | 3/2010 | Yeh et al. |
| 7,689,493 | B1 | 3/2010 | Sullivan et al. |
| 7,716,060 | B2* | 5/2010 | Germeraad et al. ............... 707/923 |
| 7,725,467 | B2 | 5/2010 | Yamamoto et al. |
| 7,725,475 | B1 | 5/2010 | Alspector et al. |
| 7,725,525 | B2 | 5/2010 | Work |
| 7,730,063 | B2 | 6/2010 | Eder |
| 7,805,536 | B1 | 9/2010 | Kompella et al. |
| 7,818,191 | B2 | 10/2010 | Lutnick et al. |
| 7,822,745 | B2 | 10/2010 | Fayyad et al. |
| 7,831,586 | B2 | 11/2010 | Reitter et al. |
| 7,885,987 | B1* | 2/2011 | Lee ............... 707/923 |
| 7,958,120 | B2 | 6/2011 | Muntz et al. |
| 7,984,029 | B2 | 7/2011 | Alspector et al. |
| 7,996,753 | B1 | 8/2011 | Chan et al. |
| 8,024,372 | B2* | 9/2011 | Harik et al. ............... 707/737 |
| 8,050,965 | B2 | 11/2011 | Hellevik et al. |
| 8,301,617 | B2 | 10/2012 | Muntz et al. |
| 8,370,362 | B2 | 2/2013 | Szabo |
| 8,380,721 | B2 | 2/2013 | Rezaei et al. |
| 8,412,575 | B2 | 4/2013 | Labio et al. |
| 8,417,695 | B2 | 4/2013 | Zhong et al. |
| 8,468,118 | B2* | 6/2013 | Kim et al. ............... 707/930 |
| 2001/0037324 | A1* | 11/2001 | Agrawal et al. ............... 707/1 |
| 2001/0049688 | A1 | 12/2001 | Fratkina et al. |
| 2002/0016782 | A1* | 2/2002 | Cooper ............... 706/15 |
| 2002/0049792 | A1 | 4/2002 | Wilcox et al. |
| 2002/0080180 | A1 | 6/2002 | Mander et al. |
| 2002/0087884 | A1 | 7/2002 | Shacham et al. |
| 2002/0091846 | A1* | 7/2002 | Garcia-Luna-Aceves et al. ............... 709/230 |
| 2002/0143742 | A1* | 10/2002 | Nonomura et al. ............... 707/1 |
| 2003/0046307 | A1* | 3/2003 | Rivette et al. ............... 707/104.1 |
| 2003/0115191 | A1 | 6/2003 | Copperman et al. |
| 2003/0187881 | A1 | 10/2003 | Murata et al. |
| 2003/0217139 | A1 | 11/2003 | Burbeck et al. |
| 2003/0217140 | A1 | 11/2003 | Burbeck et al. |
| 2003/0220866 | A1 | 11/2003 | Pisaris-Henderson et al. |
| 2003/0227479 | A1 | 12/2003 | Mizrahi et al. |
| 2004/0024739 | A1 | 2/2004 | Copperman et al. |
| 2004/0064438 | A1 | 4/2004 | Kostoff |
| 2004/0080524 | A1* | 4/2004 | Yeh et al. ............... 345/700 |
| 2004/0085797 | A1 | 5/2004 | Mei et al. |
| 2004/0093328 | A1 | 5/2004 | Damle |
| 2004/0122803 | A1 | 6/2004 | Dom et al. |
| 2004/0133555 | A1* | 7/2004 | Toong et al. ............... 707/2 |
| 2004/0170328 | A1 | 9/2004 | Ladwig et al. |
| 2004/0267638 | A1 | 12/2004 | Giunta |
| 2005/0010556 | A1 | 1/2005 | Phelan |
| 2005/0021461 | A1 | 1/2005 | Flake et al. |
| 2005/0021531 | A1 | 1/2005 | Wen et al. |
| 2005/0033742 | A1* | 2/2005 | Kamvar et al. ............... 707/7 |
| 2005/0055321 | A1 | 3/2005 | Fratkina et al. |
| 2005/0064618 | A1 | 3/2005 | Brown et al. |
| 2005/0065980 | A1 | 3/2005 | Hyatt et al. |
| 2005/0086260 | A1 | 4/2005 | Canright et al. |
| 2005/0097204 | A1 | 5/2005 | Horowitz et al. |
| 2005/0113691 | A1 | 5/2005 | Liebschner |
| 2005/0114198 | A1 | 5/2005 | Koningstein et al. |
| 2005/0114763 | A1* | 5/2005 | Nonomura et al. ............... 707/3 |
| 2005/0117593 | A1 | 6/2005 | Shand |
| 2005/0138070 | A1 | 6/2005 | Huberman et al. |
| 2005/0144065 | A1 | 6/2005 | Calabria et al. |
| 2005/0144162 | A1 | 6/2005 | Liang |
| 2005/0160107 | A1 | 7/2005 | Liang |
| 2005/0182755 | A1* | 8/2005 | Tran ............... 707/3 |
| 2005/0203838 | A1 | 9/2005 | Zhang et al. |
| 2005/0210008 | A1* | 9/2005 | Tran et al. ............... 707/3 |
| 2005/0210027 | A1 | 9/2005 | Aggarwal et al. |
| 2005/0222900 | A1 | 10/2005 | Fuloria et al. |
| 2005/0256905 | A1* | 11/2005 | Gruhl et al. ............... 707/104.1 |
| 2005/0256949 | A1 | 11/2005 | Gruhl et al. |
| 2005/0283461 | A1 | 12/2005 | Sell et al. |
| 2006/0004703 | A1 | 1/2006 | Spivack et al. |
| 2006/0041548 | A1 | 2/2006 | Parsons et al. |
| 2006/0047649 | A1 | 3/2006 | Liang |
| 2006/0080422 | A1 | 4/2006 | Huberman et al. |
| 2006/0085408 | A1 | 4/2006 | Morsa |
| 2006/0106793 | A1 | 5/2006 | Liang |
| 2006/0106847 | A1* | 5/2006 | Eckardt et al. ............... 707/101 |
| 2006/0112105 | A1 | 5/2006 | Adamic et al. |
| 2006/0112111 | A1 | 5/2006 | Tseng et al. |
| 2006/0167784 | A1 | 7/2006 | Hoffberg |
| 2006/0168065 | A1 | 7/2006 | Martin |
| 2006/0171331 | A1 | 8/2006 | Previdi et al. |
| 2006/0184464 | A1 | 8/2006 | Tseng et al. |
| 2006/0209727 | A1 | 9/2006 | Jennings, III et al. |
| 2006/0212350 | A1 | 9/2006 | Ellis et al. |
| 2006/0218035 | A1 | 9/2006 | Park et al. |
| 2006/0235841 | A1 | 10/2006 | Betz et al. |
| 2006/0242017 | A1 | 10/2006 | Libes et al. |
| 2006/0271564 | A1 | 11/2006 | Muntz et al. |
| 2006/0294155 | A1 | 12/2006 | Patterson |
| 2007/0025364 | A1 | 2/2007 | Kodialam et al. |
| 2007/0033103 | A1 | 2/2007 | Collins et al. |
| 2007/0061300 | A1 | 3/2007 | Ramer et al. |
| 2007/0143329 | A1 | 6/2007 | Vigen |
| 2007/0174255 | A1 | 7/2007 | Sravanapudi et al. |
| 2007/0203903 | A1 | 8/2007 | Rezaei et al. |
| 2007/0239534 | A1 | 10/2007 | Liu et al. |
| 2007/0245035 | A1 | 10/2007 | Rezaei et al. |
| 2007/0300152 | A1 | 12/2007 | Baugher |
| 2008/0033932 | A1 | 2/2008 | DeLong et al. |
| 2008/0065483 | A1 | 3/2008 | Ball |
| 2008/0086592 | A1 | 4/2008 | Stephani |
| 2008/0104061 | A1 | 5/2008 | Rezaei |
| 2008/0232809 | A1 | 9/2008 | Beshai et al. |
| 2008/0256061 | A1 | 10/2008 | Chang et al. |
| 2008/0301033 | A1 | 12/2008 | Singh et al. |
| 2009/0043648 | A1 | 2/2009 | Mahdian et al. |
| 2009/0046678 | A1 | 2/2009 | Lee et al. |
| 2009/0086663 | A1 | 4/2009 | Ho et al. |
| 2009/0157855 | A1 | 6/2009 | Adam et al. |
| 2009/0168768 | A1 | 7/2009 | Chiabaut et al. |
| 2009/0265475 | A1 | 10/2009 | Fujita |
| 2009/0281900 | A1 | 11/2009 | Rezaei et al. |
| 2009/0296719 | A1 | 12/2009 | Maier et al. |
| 2009/0300009 | A1 | 12/2009 | Rezaei et al. |
| 2010/0114879 | A1 | 5/2010 | Zhong et al. |
| 2011/0113032 | A1 | 5/2011 | Boscolo et al. |
| 2012/0084358 | A1 | 4/2012 | Muntz et al. |
| 2013/0046842 | A1 | 2/2013 | Muntz et al. |
| 2013/0198191 | A1 | 8/2013 | Hernandez et al. |
| 2014/0067535 | A1 | 3/2014 | Rezaei et al. |

FOREIGN PATENT DOCUMENTS

| | | |
|---|---|---|
| WO | 2006121575 A2 | 11/2006 |
| WO | 2007084616 A2 | 7/2007 |

(56) References Cited

FOREIGN PATENT DOCUMENTS

WO 2007084778 A2 7/2007
WO 2007100923 A2 9/2007

OTHER PUBLICATIONS

Silverberg et. al., A Percolation Model of Innovation in Complex Technology Spaces, 2002, MERIT-Infonomics Research Memorandum series, pp. 1-24.*
Office Action in U.S. Appl. No. 11/680,599, mailed Jul. 3, 2013.
Office Action in U.S. Appl. No. 11/923,546, mailed Jun. 6, 2013.
Office Action in U.S. Appl. No. 12/130,171, mailed May 28, 2013.
Bagrow, J. P. et al., "A Local Method for Detecting Communities," Physical Review E, vol. 72, No. 4, 2005, 046108, pp. 1-16.
Bollobas, B., "Random Graphs," Second Edition, Cambridge University Press, United Kingdom, 2001, Chapter 1 and 2, pp. 1-59.
Boscolo, R., et al., "Functionality Encoded in Topology? Discovering Macroscopic Regulatory Modules from Large-Scale Protein-DNA Interaction Networks," Reprint arXiv:q-bio/0501039, Jan. 2005.
Calado, P., et al., "Combining Link-Based and Content_Based Methods for Web Document Classifications," CIKM'03, pp. 394-401, ACM, 2003.
Chao, I. et al., "Tag Mechanisms Evaluated for Coordination in Open Multi-Agent Systems," ESAW 2007, LNAI 4995, Springer-Verlag Berlin Heidelberg, 2008, pp. 254-269.
Chung, F. et. al., "The Small World Phenomenon in Hybrid Power Law Graphs," Lect. Notes Phys., vol. 650, 2004, pp. 89-104.
Clauset, A. et al., "Finding Community Structure in Very Large Networks," Physical Review, vol. 70, No. 6, Dec. 2004, 066111.
Erdos, P. et al., "On the Evolution of Random Graphs," Publication of the Mathematical Institute of the Hungarian Academy of Sciences, vol. 5, 1960, pp. 343-347.
Erdos, P. et al., "On the Strength of Connectedness of a Random Graph," Acta Mathematica Scientia Hungarica, vol. 12, Nos. 1-2, 1961, pp. 261-267.
Flake, G. W. et al., "Self-Organization and Identification of Web Communities," IEEE Computer Society, vol. 35, Issue 3, Mar. 2002, pp. 66-71.
Franceschetti, M. et. al., "Navigation in Small World Networks, a Scale-Free Continuum Model," Jul. 2003, pp. 1-9.
Franceschetti et. al., "Closing the Gap in the Capacity of Wireless Networks Via Percolation Theory," Oct. 26, 2004, IEEE, pp. 1-10.
Garton, L. et al., "Studying On-Line Social Networks," Doing Internet Research, Edited by S. Jones, Thousand Oaks, Calif., 1999, pp. 75-105.
Girvan, M. et al., "Community Structure in Social and Biological Networks," PNAS, vol. 99, No. 12, Jun. 2002, pp. 7821-7826.
Golbeck, "Accuracy of Metrics for Inferring Trust and Reputation in Semantic Web-based Social Networks," Apr. 2004, pp. 1-11.
Gonzalez-Barahona, J. M. et al., "Community Structure of Modules in the Apache Project," MSR '05: Proceedings of the 2005 International Workshop on Mining Software Repositories, 2005.
Kernighan, B. W. et al., "An Efficient Heuristic Procedure for Partitioning Graphs," The Bell System Technical Journal 49, Feb. 1970, pp. 291-307.
Kini et. al., "Fast and efficient randomized flooding on lattice sensor networks", Nov. 19, 2004, Drexler University, pp. 1-33.
Lyons, R. et al., "Probability on Trees and Networks," Apr. 17, 2005, pp. 1-53.
Manku, G. S. et. al., "Know thy Neighbor: the Power of Lookahead in Randomized P2P Networks," STOC'04, Jun. 2004, pp. 1-10.
Newman, M. E. J., "Coauthorship Networks and Patterns of Scientific Collaboration," PNAS, vol. 101, Apr. 2004, pp. 5200-5205.
Newman, M. E. J., "Fast Algorithm for Detecting Community Structure in Networks," Physical Review E 69, Jun. 2004, pp. 066133.1-066133.5.
Newman, M.E.J. et al. "Finding and Evaluating Community Structure in Networks," Physical Review E, vol. 69, 026113, 2004, pp. 1-16.
Owczarek, A. L. et. al., "Generalised Percolation Probabilities for the Self-Dual Potts Model," J. Phys. A: Math. Gen. 20, Apr. 1987, pp. 5263-5271.
"Page, L. et al.,""The PageRank Citation Ranking: Bringing Order to the Web,""Technical Report, Stanford InfoLab, 1999."
Patch, K., "Simple Search Lightens Net load," TRN, Sep. 2004, pp. 1-3.
Pons, P. et al., "Computing Communities in Large Networks Using Random Walks," ArXiv Condensed Matter e-prints, Dec. 2004.
Pothen, A. et al., "Partitioning Sparse Matrices with Eigenvectors of Graphs," Society of Industrial and Applied Mathematics, SIAM Journal on Matrix Analysis and Applications, vol. 11, No. 3, Jul. 1990, pp. 430-452.
Radicchi, F. et al., "Defining and Identifying Communities in Networks," PNAS, vol. 101, No. 9, Mar. 2004, pp. 2658-2663.
Rives, A. W. et al., "Modular Organization of Cellular Networks," PNAS, vol. 100, No. 3, Feb. 2003, pp. 1128-1133.
Sarshar, N. et al., "Scalable Percolation Search in Power Law Networks," Jun. 2004, Department of Electrical Engineering, University of California, Los Angeles, pp. 1-13.
Scott, J. "Social Network Analysis: A Handbook," 2nd Edition, Sage Publications, London, 2000, Chapter 4, pp. 63-81.
Wasserman, S. "Social Network Analysis: Methods and Applications," Cambridge University Press, Cambridge, England, 1994, pp. 17-20 and Chapter 7, pp. 249-290.
"Weikum, G. et al.,""Towards Self-Organizing Query Routing and Processing for Peer-to-Peer Web Search", DELIS-TR-0287, 2005, 19 pages.
Wellman, B. et al., "Computer Networks as Social Networks: Collaborative Work, Telework, and Virtual Community," Annual Reviews Sociology, vol. 22, No. 1, 1996, pp. 213-238.
Wu, F. et al., "Finding Communities in Linear Time: a Physics Approach," The European Physical Journal B, vol. 38, No. 2, 2004, pp. 331-338.
Zachary, W. W. "An Information Flow Model for Conflict and Fission in Small Groups," Journal of Anthropological Research, vol. 33, No. 4, Winter, 1977, pp. 452-473.
Chinese Office Action (First) in Chinese Patent Application No. 200680025190.6, dated Sep. 11, 2009.
Chinese Office Action (Second) in Chinese Patent Application No. 200680025190.6, dated Jun. 3, 2010.
Japanese Office Action in Application No. 2008-511129 dated Jul. 26, 2011.
International Search Report and Written Opinion for PCT Application No. PCT/US2006/14160, mailed Sep. 4, 2007.
International Search Report and Written Opinion for PCT Application No. PCT/US2007/001335, mailed Feb. 12, 2008.
International Search Report and Written Opinion for PCT Application No. PCT/US2007/001694, mailed Feb. 14, 2008.
International Search Report and Written Opinion for PCT Application No. PCT/US2007/005504, mailed Jul. 29, 2008.
Office Action in U.S. Appl. No. 11/125,329, mailed Mar. 30, 2010.
Office Action in U.S. Appl. No. 11/125,329, mailed Jun. 24, 2009.
Notice of Allowance in U.S. Appl. No. 11/125,329, mailed Feb. 2, 2011.
Notice of Allowance in U.S. Appl. No. 13/098,870, mailed Jun. 28, 2012.
Office Action in U.S. Appl. No. 11/624,674, mailed Mar. 15, 2010.
Office Action in U.S. Appl. No. 11/624,674, mailed Sep. 21, 2010.
Office Action in U.S. Appl. No. 11/624,674, mailed Dec. 20, 2011.
Notice of Allowance in U.S. Appl. No. 11/624,674, mailed Oct. 12, 2012.
Office Action in U.S. Appl. No. 11/625,279, mailed Mar. 18, 2009.
Office Action in U.S. Appl. No. 11/625,279, mailed Dec. 8, 2009.
Office Action in U.S. Appl. No. 11/625,279, mailed May 13, 2010.
Office Action in U.S. Appl. No. 11/625,279, mailed Oct. 25, 2010.
Office Action in U.S. Appl. No. 11/625,279, mailed Sep. 16, 2011.
Office Action in U.S. Appl. No. 11/625,279, mailed Apr. 17, 2012.
Office Action in U.S. Appl. No. 11/625,279, mailed Feb. 12, 2013.
Office Action in U.S. Appl. No. 11/680,599, mailed Apr. 29, 2009.
Office Action in U.S. Appl. No. 11/680,599, mailed May 21, 2010.
Office Action in U.S. Appl. No. 11/680,599, mailed Jan. 5, 2011.
Office Action in U.S. Appl. No. 11/680,599, mailed Aug. 29, 2011.

(56) References Cited

OTHER PUBLICATIONS

Office Action in U.S. Appl. No. 11/680,599, mailed Apr. 30, 2012.
Office Action in U.S. Appl. No. 11/923,546, mailed Feb. 26, 2010.
Office Action in U.S. Appl. No. 11/923,546, mailed Aug. 2, 2010.
Office Action in U.S. Appl. No. 11/923,546, mailed Dec. 22, 2010.
Office Action in U.S. Appl. No. 11/923,546, mailed Jun. 3, 2011.
Office Action in U.S. Appl. No. 11/923,546, mailed Aug. 27, 2012.
Office Action in U.S. Appl. No. 12/130,171, mailed Apr. 1, 2011.
Office Action in U.S. Appl. No. 12/130,171, mailed Oct. 19, 2011.
Office Action in U.S. Appl. No. 12/130,171, mailed Aug. 15, 2012.
Office Action in U.S. Appl. No. 12/436,748, mailed Sep. 16, 2011.
Office Action in U.S. Appl. No. 12/436,748, mailed May 2, 2012.
Office Action in U.S. Appl. No. 12/476,205, mailed Oct. 12, 2011.
Office Action in U.S. Appl. No. 12/476,205, mailed Jul. 3, 2012.
Office Action in U.S. Appl. No. 12/610,202, mailed May 22, 2012.
Notice of Allowance in U.S. Appl. No. 12/610,202, mailed Dec. 10, 2012.
Office Action in U.S. Appl. no. 12/906,051, mailed Mar. 13, 2012.
Office Action in U.S. Appl. No. 12/906,051, mailed Oct. 2, 2012.
Final Office Action in U.S. Appl. No. 11/625,279, mailed Oct. 3, 2013.
Office Action in U.S. Appl. No. 13/660,955, mailed Jan. 8, 2014.
Newman, et al., "Scaling and percolation in the small-world network model", Sante Fe Institute, May 6, 1999, pp. 1-12.
Newman, M.E.J., "Random Graphs as Models of Networks", SFI Working Paper: 2002-02-005, 2002, pp. 1-36.
Wang, G., "Web Search with Personalization and Knowledge", 2002 Proceedings of the IEEE Fourth International Symposium on Multimedia Software Engineering (MSE '02).
Zou et al., "Email Virus Propagation Modeling and Analysis", Univ. of Mass., Dept. of Electrical and Computer Engineering, Dept of Computer Science, 2004, TR-CSE-03-04, pp. 1-17.
Notice of Allowance in U.S. Appl. No. 13/660,955, mailed Jun. 16, 2014.
Notice of Allowance in U.S. Appl. No. 11/625,279, mailed Apr. 16, 2014.
Notice of Allowance in U.S. Appl. No. 11/680,599, mailed Apr. 30, 2014.
Office Action in U.S. Appl. No. 12/130,171, mailed Mar. 26, 2014.

* cited by examiner

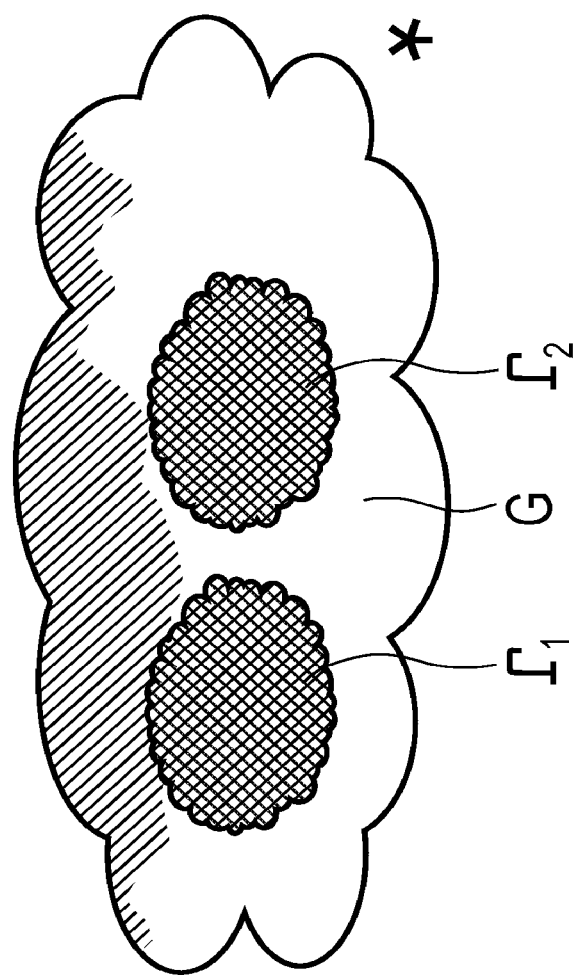

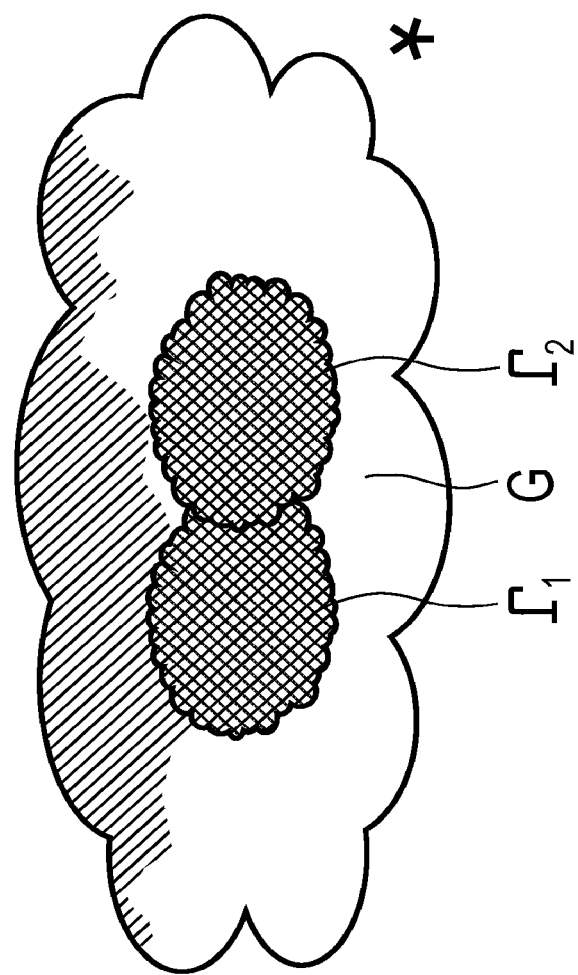

(b)GN Algorithm from [9]

METHODS AND APPARATUS FOR DISTRIBUTED COMMUNITY FINDING

RELATED APPLICATIONS

The present application is a continuation of U.S. patent application Ser. No. 13/098,870, filed May 2, 2011, which is a continuation of U.S. patent application Ser. No. 11/125,329, filed May 10, 2005, and the disclosures of which are hereby incorporated herein by reference in their entireties.

FIELD OF THE INVENTION

The present invention relates in general to methods for analyzing relational systems where nodes have local interactions or links, and in particular to methods for analyzing linked databases.

BACKGROUND

Most information databases and knowledge repositories may be viewed as comprising classes of objects that interact with each other, as qualified by different relationships. These classes of objects and their interactions may also change with time, providing a dynamic view of the interaction patterns. Thus, based on available meta-information about the objects and their relationships, one may capture a body of knowledge in terms of a dynamic complex network, where nodes represent entities or objects belonging to the different object classes, and links represent the fact that the associated nodes are related via a particular type of relationship. For example, in a friendship information database, the nodes correspond to individuals, and links correspond to the fact that two individuals know each other. To capture the complex nature of, and nuances inherent in, almost all information repositories, a linked database or the network representation has to be suitably annotated. For example, in the case of friendship information, each node would have relevant information about the individual it represents (e.g., age, sex, race, location, hobbies, profession etc.) and each link has to be qualified with attributes, such as the nature of relationship (e.g., romantic, work related, hobby related, family, went to school together etc.) and the strength of the relationship (e.g., frequency of contacts etc.).

The above-mentioned linked database or information network may easily become very large-scale, comprising millions of nodes and links. For example, the world wide web (www) comprises a network of this type with potentially billions of nodes and links and complex relationships that qualify the links connecting the nodes or URLs. The large-scale and time-varying nature of such networks make them dynamic complex networks, and their size has prevented a direct and comprehensive mining and querying of such networks. The most common strategy has been to build structured databases, derived from the underlying network, and then to query these structured databases efficiently using existing tools. However, these indexed databases only capture particular slices or projections of the underlying network and do not provide answers to queries that do not directly fit the slice that was extracted to create the database. A good example is the service provided by Google: Given key words, it provides one with web pages that have the specified key words, and ranked according to their relevance or importance; the relevance or importance of a page is determined by its location in the global www, i.e., how many other "important" pages point to it etc. However, if one were to ask, for example, what is a company's web presence, in the sense of what types of individuals and news organizations are reporting on the company and who they represent and if they are relevant or important to the company, then there are no easy key words to get this information; and one may have to perform an exhaustive search with different key words followed by much post-processing in order to infer such information. Even then, one might get only those individuals or organizations who have directly reported on the company and it will be hard to get other individuals and organizations that are closely related to these direct reporters. Clearly, such information is embedded in the underlying network but not accessible via key words based searches. It has not been clear how one might address this issue and extract such information efficiently.

Recently, some progress has been made in this direction and people have started exploring so-called "communities" in complex networks or graphs. The underlying motivation comes from the fact that often we know a lot about an individual by studying the communities that the individual belongs in. The concepts of such "communities" have been solely structural so far, and different researchers have used different concepts of communities in the literature. However, a common thread is the understanding that a structural community is a set of nodes that are much more interconnected amongst themselves than with the rest of the nodes in the network.

Until recently the problem of finding communities in complex networks has been only studied in context of graph partitioning. Recent approaches [9, 12, 15, 21] provide new insight into how the communities may be identified and explored by optimizing the modularity partitioning of the network. These methods, inspired by diffusion theory, prune the edges with high betweenness to partition the graph from top to bottom to get cohesive communities.

Finding community structure of networks and identifying sets of closely related vertices have a large number of applications in various fields. Different methods have been used in the context of parallel computing, VLSI CAD, regulatory networks, digital library and social networks of friendship. The problem of finding partitioning of a graph has been of interest for a long time. The K-L (Kernighnan-Lin) algorithm was first proposed in 1970 for bisection of graphs for VLSI layouts to achieve load balancing. Spectral Partitioning [14] has been used to partition sparse matrices. Hierarchical clustering [18] has also been proposed to find cohesive social communities. While these algorithms perform well for certain partitioned graphs, they fail to explore and identify the community structure of general complex networks. In particular they usually require the number of communities and their size as input.

A number of divisive and agglomerative clustering algorithms are proposed. These algorithms, mostly inspired by diffusion theory concepts, identify boundaries of communities as edges or nodes with high betweenness. While there is no standard definition for a community or group in a network, they use a proposed definition based on social formation and interaction of groups [19]. Radicchi et. al. [15] similar to [9] define communities in strong and weak sense. A subgraph is a community in a strong sense if each node has more connections within the community than with the rest of the graph. In a similar fashion, a subgraph is a community in a weak sense if the sum of all degrees within the subgraph is larger than sum of all degrees toward the rest of the network. A similar definition is used in [7] to define web communities as a collection of web pages such that each member page has more hyper-links (in either direction) within the community than outside of the community. Inspired by the social definition of groups, Girvan and Newman [9] propose a divisive algorithm using several edge betweenness definitions to prune the network edges and partition the network into several communities. This algorithm has a heavy computational complexity of $O(m^2n)$ on an arbitrary network with m edges and n vertices. Faster algorithms are based on betweenness and similar ideas [12, 15, 21] and a modularity measure is proposed [12] to measure quality of communities. A faster implementation of [12] is reported [4] to run more quickly: $O(md \log n)$ where d is the depth of the dendrogram describing the community structure of the network.

Fast community finding algorithms using local algorithms may help in analyzing very large scale networks and may prove useful in complex network identification and analysis applications. These methods are applied to a number of different applications including social networks [13], biological networks [3, 17] and software networks [11].

However, the proposed methods fail to identify overlapping communities and how strong a node belongs to a community. They also require global knowledge of the network to generate communities of a particular subset of the network. Hueberman et. al. [21] note that a GN algorithm may be highly sensitive to network structure and may result in different solutions with small perturbation in network structure. As a solution they propose a randomized version of these algorithms to achieve robustness and confidence in community structure. But the algorithm is still centralized and requires global knowledge of the network. A number decentralized algorithms are based on random walks [10], or 1-shell spreading [1]. These algorithms propose local methods to identify community structure of complex networks.

The proposed approaches have shortcomings, including the following.

Requirement for Global Knowledge. Proposed approaches require a global knowledge of network structure. i.e. they need to know global structure of the network in order to discover community structure of a particular subset of nodes and their surroundings. This is especially important for large scale networks where one is usually interested in communities of a particular node or set of nodes.

Inability to Deal with Overlapping Communities. Proposed community finding algorithms still find only cohesive subgroups. [19], i.e. they partition the network into communities and provide a dendrogram of community structure. It is noted that cohesive subgroups like LS and λ sets may not overlap by sharing some but not all members [19][23]. The fact that these sets are related by containment means that within a graph there is a hierarchy of a series of sets. Often, real-world networks do not have cohesive and independent clusters, but rather have overlapping communities like affliation networks. Such networks are two-mode networks that focus on the affliation of a set of actors with a set of events or communities, where each event consists of a subset of possibly overlapping communities. New algorithms are then needed to capture overlapping of communities.

Complexity. An implementation of Newman fast community finding [4] is reported to run in $O(md \log n)$ where d is the depth of the dendrogram describing the community structure. For many applications it is only required to find a community of a certain size related to a subset of nodes. Proposed diffusion-based algorithms do not scale in the sense that they require processing of the whole network to get local structures. A down to top local algorithm may provide flexibility of search constraints.

Lack of Confidence. One GN method does not provide any confidence for nodes in a community. This issue is revisited in [21] but still there is no complete framework defined to measure confidence of a node belonging to a community.

Structural vs. Informational Communities: The existing community finding algorithms find communities comprising nodes that are clustered or more linked among themselves than with the rest of the nodes in the network. However, in a linked database, there are different types of edges and nodes, and one might be interested in communities with respect to different relationships. For example, in the friendship network, we might be interested only in the communities that are based on romantic and family relationships. In such a case, we are dealing with a sub-network of interest where only the edges representing such relationships are kept and others are deleted. Similarly, one might ask about the community structure specific only to a time period or those restricted to a set of geographical locations. Such communities may be referred to as informational communities. It is clear that if one were to pre-compute such informational communities and their various combinations, unions, and intersections, for each node, then one will hit the wall of combinatorial explosion very soon. This further underscores the need for finding query-based informational communities. Moreover, as noted earlier one might be interested in informational communities of a particular node or a set of nodes.

SUMMARY OF THE INVENTION

The present invention takes advantage of the local nature of how communities form in networks, and that percolation provides a means to explore and identify overlapping communities in a local and distributed fashion. To be more precise, defined herein is a local structural community of a node or a set of nodes that (i) may be reached via percolation of messages from the given node a "high" percentage of time (the exact threshold to define "high" is a parameter that may be tuned) under repeated trials at a fixed percolation probability, and (ii) the size of the set remains fixed for a range of percolation probabilities. The strength of a node in such a structural community is a measure of how often the percolation message reaches it and the percolation probability used to obtain the community. For example, if the percolation probability is set to 1 then one would reach the whole network, assuming it forms a single connected component; so the higher the probability needed to reach a node, the lower should the strength of the node be in the community. By performing percolation from a set of nodes at various probabilities and determining their intersections and overlaps, one may determine the local structural communities of a set of nodes according to the present invention.

The relevance of the above definition of local communities is supported by the theory of percolation and percolation thresholds, as described below; moreover, as shown in our results, this definition subsumes the commonly-used criteria for defining communities in the literature. A particular topic of interest is the relationship of the communities defined herein with the concept of the k-hop neighborhood of a given node. In the latter, all nodes that may be reached within k hops of a node are determined. A potential problem with such a definition of a local community is that, in most complex networks, one would reach almost all the nodes in a few hops and the number of nodes reached in for example 2 or 3 hops is very large. Not all of these nodes are relevant to the node of interest. The method of defining communities in terms of percolation of messages is shown later on to be a robust one, and may be related to the concept of communities in various branches of science, engineering, and social sciences.

This concept of local structural community may now be generalized to include the construction of local informational community. In an informational community one wants to include or emphasize only those relationships that are of interest. This is incorporated in a framework according to the present invention by performing weighted percolation: When a message is percolated, the probability of it being sent on an edge is modified according to the weights associated with the node that the message sits in, as well as the weights assigned to the links. This allows one to extract communities to which a node, or a set of nodes, belongs with respect to specific attributes. For example, if one is interested in getting the community of a node in terms of its interactions with other nodes based on a specific time period, then one way would be to assign zero weights to all nodes and edges that do not belong to the time period, i.e., they were not created or did not exist during the period of interest. Also it may be noted that the concept of a local structural community is a special case of the local informational community, i.e., when all nodes and edges are treated with equal weights. Thus, in the claims and in the rest of this invention, we use the term local communities to denote local informational communities, as described above.

Starting with a database, a network may be created by identifying meta-information, for example characteristics of the data used to define nodes in the resulting network and relationships and weighting of the relationships that define the links (edges) connecting the nodes (vertices).

According to the present invention, a linked database is processed by queries identifying one or more seed nodes and giving one or more weights to types of edges and nodes and possibly different weights to each edge and node. By applying a percolation-based algorithm, and, in particular, a bond percolation algorithm such as those described in the Detailed Description below, the structural neighborhood of vertices in the network may be explored and the communities that make up their structural neighborhood identified. In addition, the strength of the relationship of a node to a community may be determined.

Further according to the present invention, the results of processing according to the present invention may be cut along various planes. Communities may be examined, for example with a text parser, to define characteristics of nodes or links in a community or a concept or set of concepts, to determine commonality among community members. This analysis may be further refined by giving higher weight to key words coming from high strength nodes recognized by their positions being central to the community. Thus both links and nodes may have their weights adjusted. Further processing according to the present invention yields subcommunities relevant to the concepts used to weight assigned to nodes and links. Such further processing may be repeated in as many iterations as desired to further refine the community structure or to cut through the communities in as many different planes as desired.

Apparatus according to the present invention include firmware encoding a percolation-based algorithm according to the present invention and hardware loaded with software encoding a percolation-based algorithm according to the present invention.

Apparatus according to the present invention also include computer readable media encoding a percolation-based algorithm according to the present invention.

Among the advantages of the present invention is the ability to employ user queries, including weighting of nodes and links, to tailor the result of the process to the objectives of the user.

Among advantages of the present invention is the ability to identify links and strengths between communities and explore strategic relationship between communities. (This is the GAP part).

A further advantage of the present invention is the ability to provide prespecified concepts and weights in packages tailored to specific applications.

Yet another advantage of the present invention is that it may be implemented with a watchdog function to monitor a database for updates relevant to user-selected parameters and to alert the user to relevant new information.

BRIEF DESCRIPTION OF THE DRAWINGS

FIG. 1A shows an original network of two overlapping communities. FIG. 1B through FIG. 1D depict edge betweenness starting from vertices 1 and 15 and for all vertex pairs. The thickness of overlapping communities. of edges are proportional to their betweenness. Edges to overlapping vertices are shown to have higher betweenness. FIG. 1E and FIG. 1F show percolation from vertex 1 and 15. Vertices within the community of source vertex have higher fraction of returned messages.

In FIG. 2A the size will be relatively constant when identifying community structures. The size of the connected component is measured for different percolation probability. Percolation is started from vertex 1 and 15 respectively as depicted in FIG. 2A and FIG. 2B.

FIGS. 4A-4B depict community network models. In FIG. 4A Graph G is again random ER graph where any pair of vertices are connected with probability $p_0$. Subgraphs $\Gamma_1$ and $\Gamma_2$ constitute vertices with a common interest or topic and thus have higher connection probability of $p_{\Gamma 1}$ and $p_{\Gamma 2}$ respectively. In FIG. 4B the communities may overlap, i.e. have vertices in common or be disjoint.

FIG. 5A illustrates the percentage of correctly classified vertices using an algorithm according to the present invention and a GN fast community finding algorithm [9] versus number of edges across communities.

FIG. 5B shows the GN algorithm fails to detect communities when the number of intercommunity edges is close to number of edges inside community while the algorithm according to the present invention detects the communities.

In FIG. 6A, original randomly generated communities are shown, Vertices only in one community are in white and black circles respectively. Vertices belonging two both communities are in squares. The rest of the vertices are in gray. FIG. 6B depicts the community finding result of a GN algorithm. The overlapping nodes are partitioned to one of the communities. Misclassified vertices are the small black circles. FIG. 6C illustrates a percolation community finding result. Nodes in overlap of two communities belong to both communities. Size of vertices is proportional to their strength in community. By construction, the community is very homogenous. Misclassified vertices are the smaller black circles.

In FIG. 7A, for the original Zachary karate club network, the nodes in blue have finally split to the administrator community while the nodes in yellow followed the administrator. FIG. 7B depicts community finding for node 1. FIG. 7C depicts community finding for node 33. FIG. 7D depicts community finding for node 34.

FIG. 9A shows top level communities found using the algorithm according to the present invention and five smaller communities are shown. Nodes with strength greater than 0.20 are in blue. The blue node sizes are proportional to how strongly they belong to the community. The communities have several overlaps as described in the Detailed Description below. FIG. 9A shows community 1 with the instructor community found by the algorithm according to the present invention. FIG. 9B shows community 4 with the administrator community found by the algorithm according to the present invention. In incorporates some overlap nodes including node 34 because of their connections to both communities. It also excludes node 12 because it has only a single connection to node 1 and is not really a part of the community. This is an important difference between the definition of community included herein and other definitions. FIG. 9C, FIG. 9 D, FIG. 9E, FIG. 9F, and FIG. 9G respectively depict communities 2, 3, 5, 6, and 7.

FIG. 10A depicts a generalized system flowchart according to the present invention, while FIG. 10B depicts a generalized system architecture according to the present invention. FIG. 10C depicts a core architectural model according to the present invention.

FIG. 11A depicts the general system flowchart. FIG. 11B shows transaction flows prior to application of an algorithm according to the present invention. FIG. 11C shows transaction flow with application of an algorithm according to the present invention.

DETAILED DESCRIPTION

In the Detailed Description, a local algorithm according to the present invention based on percolation theory is described. Then the local community finding is generalized to an algorithm to detect and explore community structure of a complex network. Thereafter benchmarking is disclosed for the algorithm using different randomly generated networks and real world networks employed in the literature to estimate the performance of community finding algorithms

EXAMPLE 1

Percolation Community Finding Approach

In this section a social definition of communities is adopted, showing that percolation identifies communities of a given vertex compared to previous diffusion based algorithms. Next, essentials and performance of the algorithm on ER random graphs are illustrated.

A. Social Communities Revisited

While other definitions provide important insight into partitioning of the graph, a more local approach is chosen herein. Unlike cohesive community definitions, Garton et. al. [8] define communities as follows. In social network analysis context, a group is an empirically-discovered structure. By examining the pattern of relationships among members of a population, groups emerge as highly interconnected sets of actors known as cliques and clusters. In network analytic language, they are densely-knit (most possibilities exist) and tightly-bounded, i.e., most relevant ties stay within the defined network [18-20]. Social network analysts then want to know who belongs to a group, as well as the types and patterns of relations that define and sustain such a group. Note that this definition differs from pervious cohesive definitions used by Newman and others that not only most relevant ties should stay within the community but also nodes should be highly interconnected. [19]. It also allows overlap between communities.

This definition arises naturally in many biological, social or web networks that vertices with close functionality or interest form highly clustered communities. A vertex is connected to many other vertices within the community.

B. Percolation: Background

In an embodiment of the present invention, bond percolation is used as a tool for vertices to explore and identify their structural neighborhood. Percolation theory was first used to study the flow of fluids in porous media and introduced a new approach to problems usually dominated by diffusion theory. Percolation theory has been used to describe randomness and disorder in the structure of the medium while diffusion processes ascribe random movements of agents in a deterministic structure. Similar concepts have been used extensively in complex networks literature to model and analyze different phenomena in the network such as random walk and network robustness to node and edge failures. Many of these nonlinear dynamic properties of complex networks undergo phase transition when subject to different factors that affect interactions of structure and movement of agents in the system.

Figure 1A:
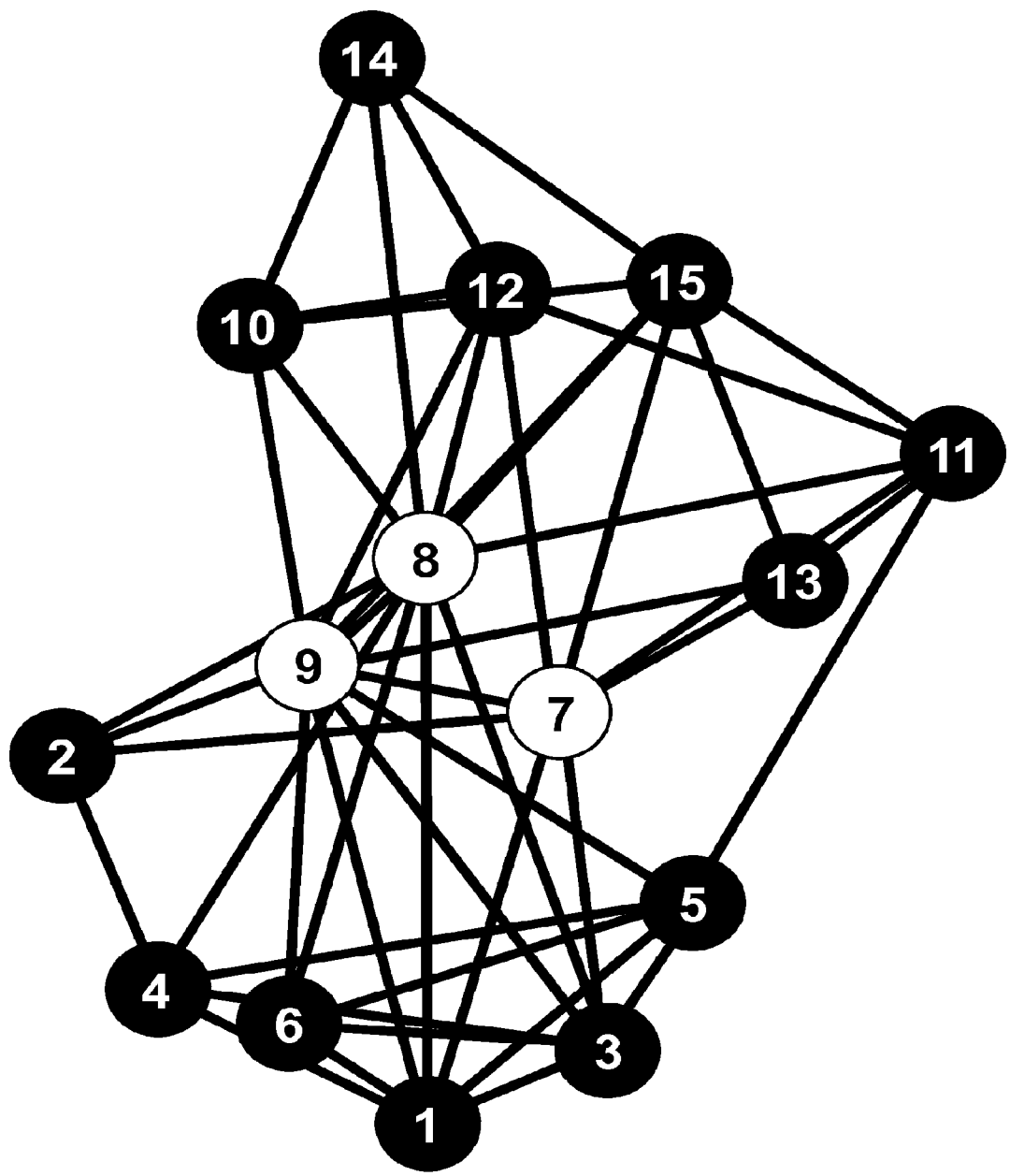
FIGS. 1A-1F: illustrate diffusion versus percolation comparing edge betweenness for a particular source or between all pair of vertices and percolation starting from a certain vertex. The network consists of two overlapping communities of 1, . . . , 9 and 7 . . . , 15
Figure 1B:
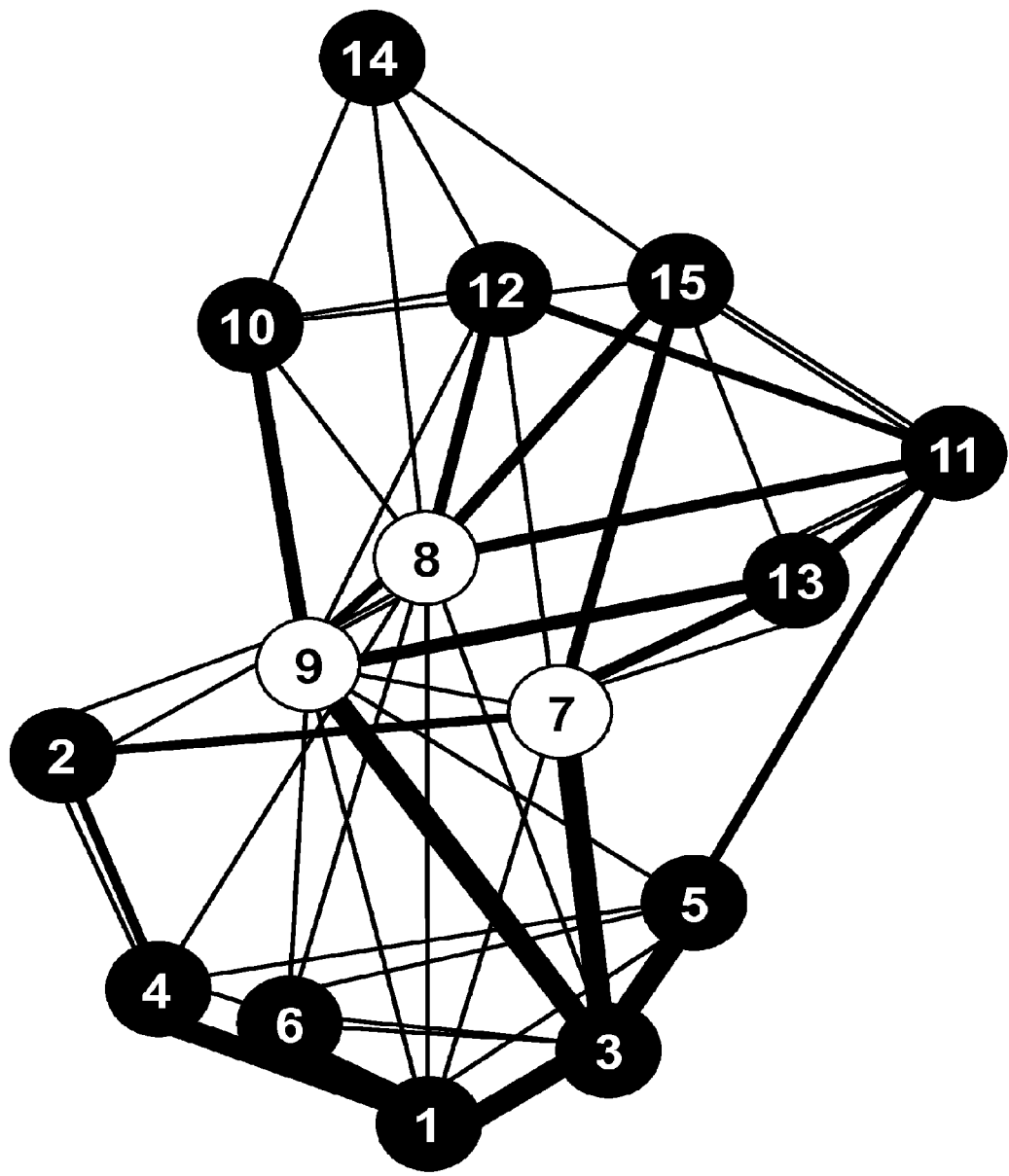
Figure 1C:
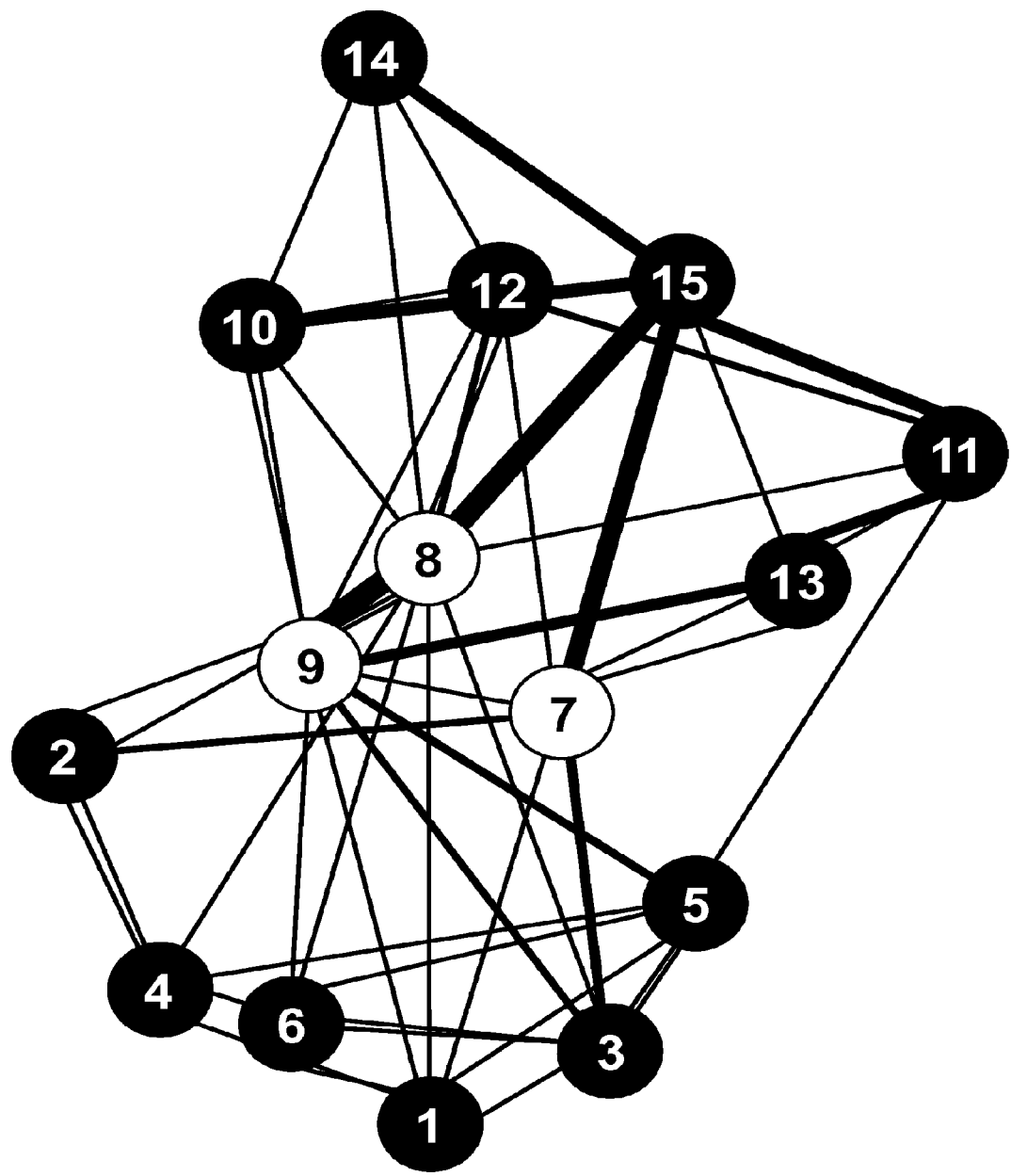
Figure 1D:
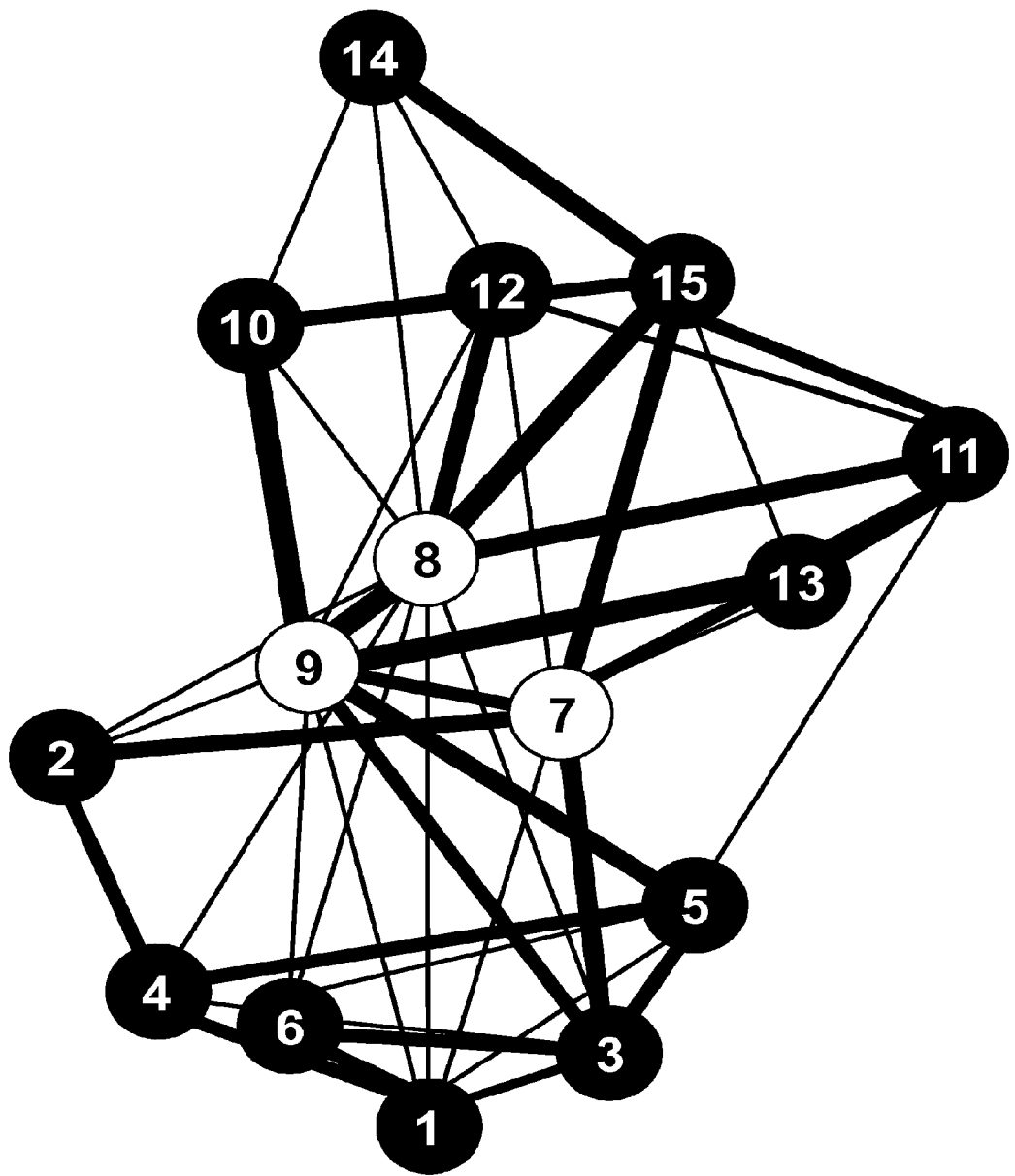
Figure 1E:
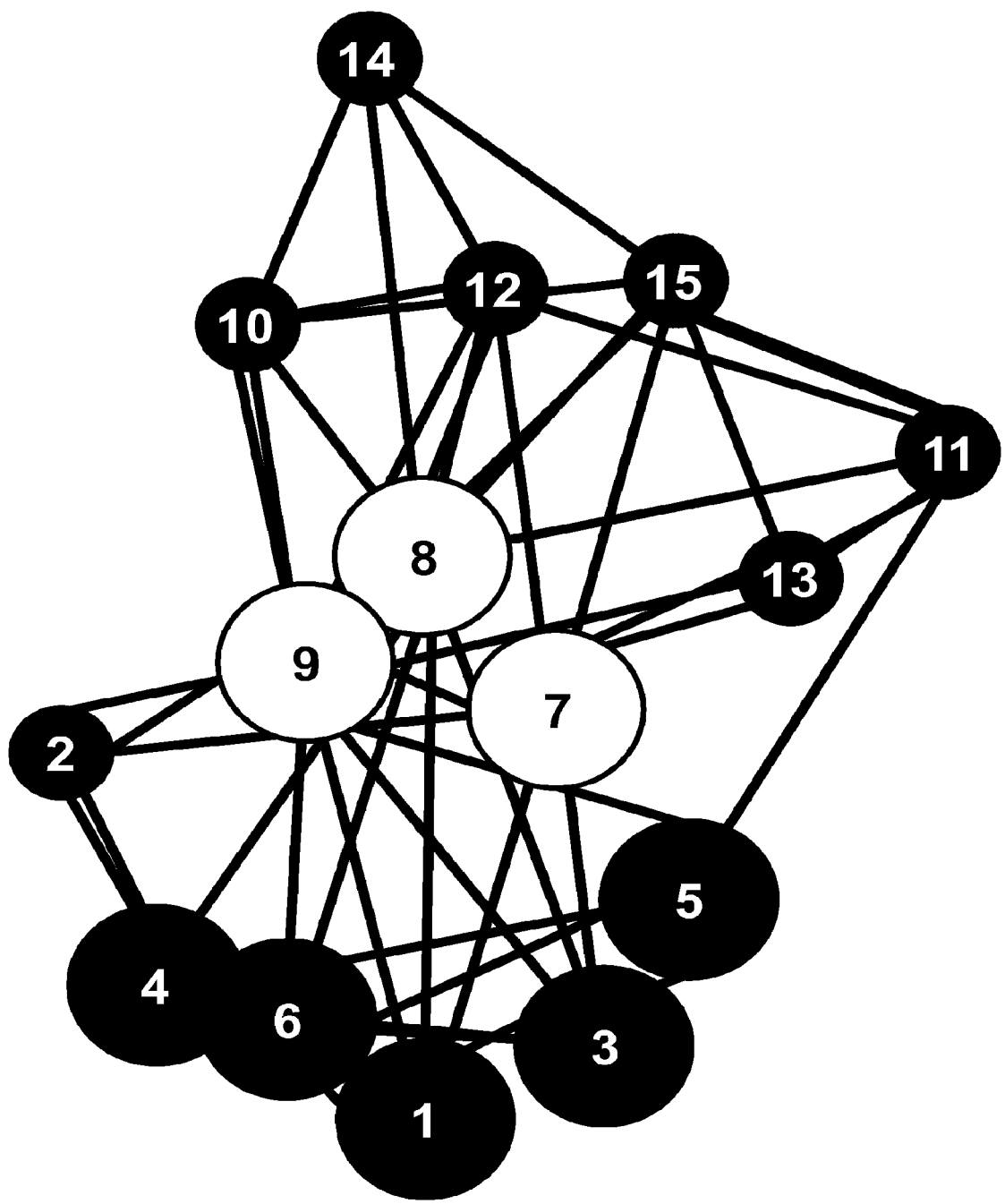
Figure 1F:
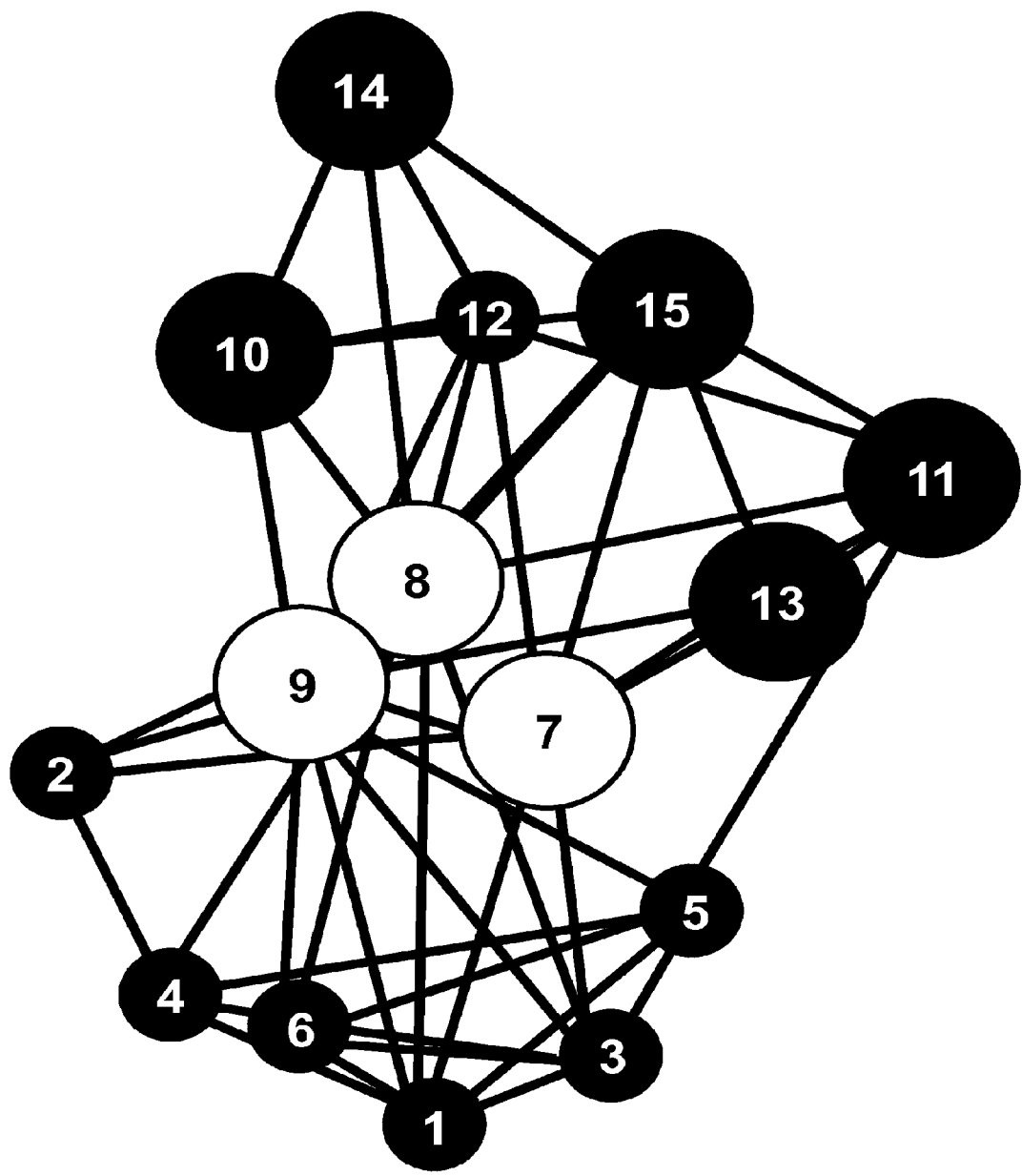
Figure 2A:
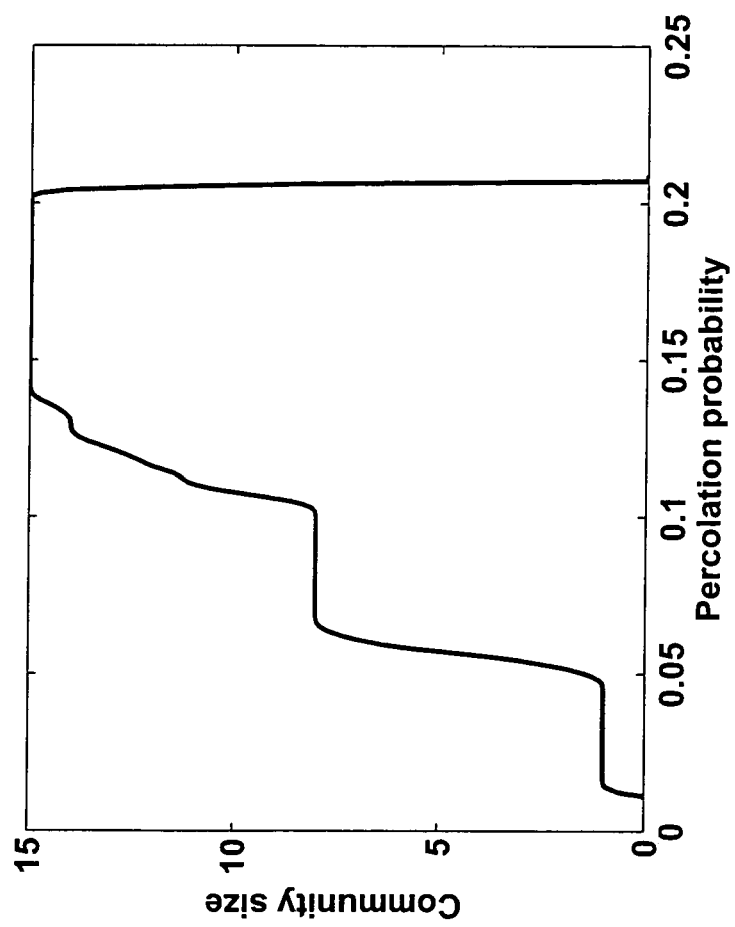
FIGS. 2A-2B illustrate the size of the connected components.
Figure 2B:
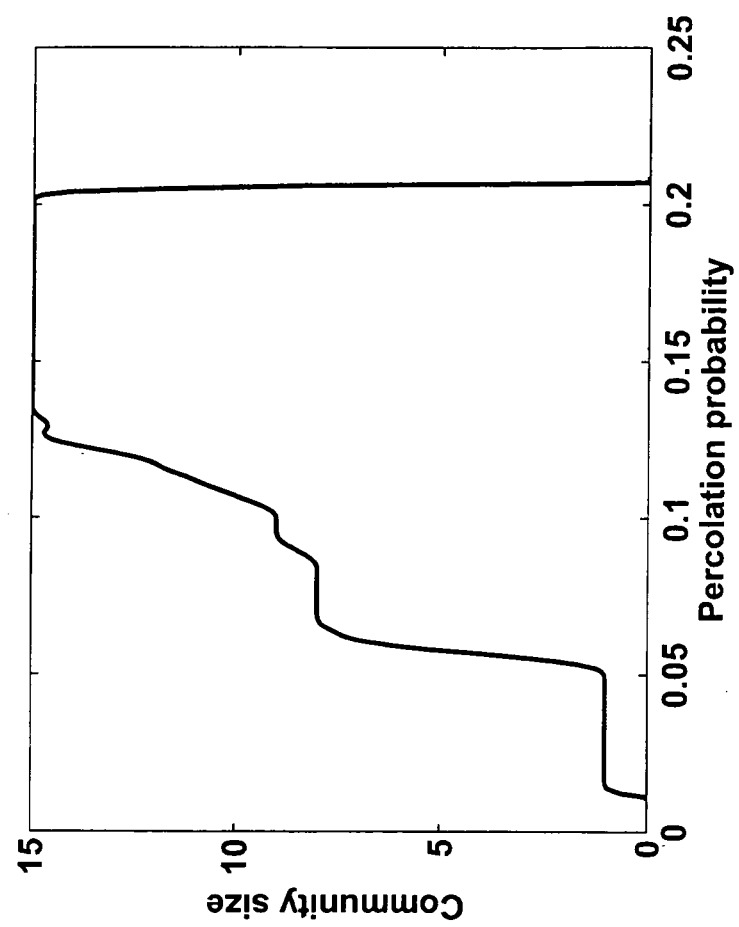

Other community finding algorithms have extensively used diffusion processes and random walks to define betweenness and identify partitioning of a network into different communities. According to the present invention, a different approach, percolation theory, is used to identify a highly clustered group of vertices that have close ties to each other. Diffusion based algorithms are based on the observation that edge betweenness [24] of edges at community boundaries are high since they enable communication between nodes in different communities. FIG. 1 illustrates this concept where thickness of edges are proportional to shortest-path betweenness between all vertices in the network. It may be easily seen that while boundaries of cohesive communities are easily identified, it does not perform well in overlapping communities. Instead of performing random walks, a percolation message is started from a node, constitutes the set of connected components and looks at the components when their size does not increase as percolation probability is increased, as shown in FIG. 2. FIG. 1D and FIG. 1E show how a distributed percolation search may return highly clustered nodes to a vertex where size of the nodes are proportional to the fraction of percolation messages returned. The random walk based algorithms may be viewed as randomized versions of breadth-first search while percolation method is a randomized version of depth-first search.

C. Performance on Random Graphs

Review of a simple community model in random graphs shows the relationship between empirical social definitions and complex network analysis. A collection of highly clustered ER graphs have been extensively used in the literature to analyze simple performance of community finding algorithms [9, 12, 15]. A random graph is a graph in which properties such as the number of graph vertices, graph edges, and connections between them are determined in some random way [2]. For many monotone-increasing properties of random graphs, graphs of a size slightly less than a certain threshold are very unlikely to have the property, whereas graphs with a few more graph edges are almost certain to have it. This is known as a phase transition or threshold phenomena. Of particular interest is the size of the largest connected component of the graph. An ER graph G(N; p) is a random graph with n vertices where each pair of vertices has an edge between them with probability p, [5, 6]. the existence of any two edges are independent events.

Consider a random ER graph of size N, where each pair of vertices are connected with probability $p_0(N)$. This may be viewed as (bond) percolation on a complete graph with percolation probability of $p_0(N)$. Erdos and Renyi [5, 6] show that the connected components have interesting properties when $p_0(N)$ scale as $p_0(N) \propto c/N$. Depending on c, following behaviors happen with probability one for large N:

I. For c<1 size of the largest connected component is $\Theta(\log(N))$.

II. At phase transition and for c=1 size of the largest connected component is $\Theta(N^{2/3})$.

III. For c>1 a giant component appears and has size $\Theta(N)$.

Remark 1: Bond percolation on an ER graph of $G(N; p_0)$ with probability $p_p$ will result in an ER graph of $G(N; p_0 p_p)$ Thus the critical percolation probability for a randomly generated graph with $p_0$ is given by $p_c = c/(p_0 N)$ where c>1. below this probability, vertex i will belong to a connected component of maximum size $\Theta(\log(N))$ and above the threshold the probability of almost all vertices belonging to a giant connected component is a constant, i.e. there is a path between any two randomly chosen pair of vertices with non vanishing constant probability for large N.

For a vertex i define set $S_i^P$ as the connected component i including vertex i when (bond) percolating with probability p. Define the community with strength p of vertex i, $C_i^P$, as pair of (j, m) where $j \in S_i^P$ for m iterations out of k iterations where $m > k_{th}$.

Figure 3:
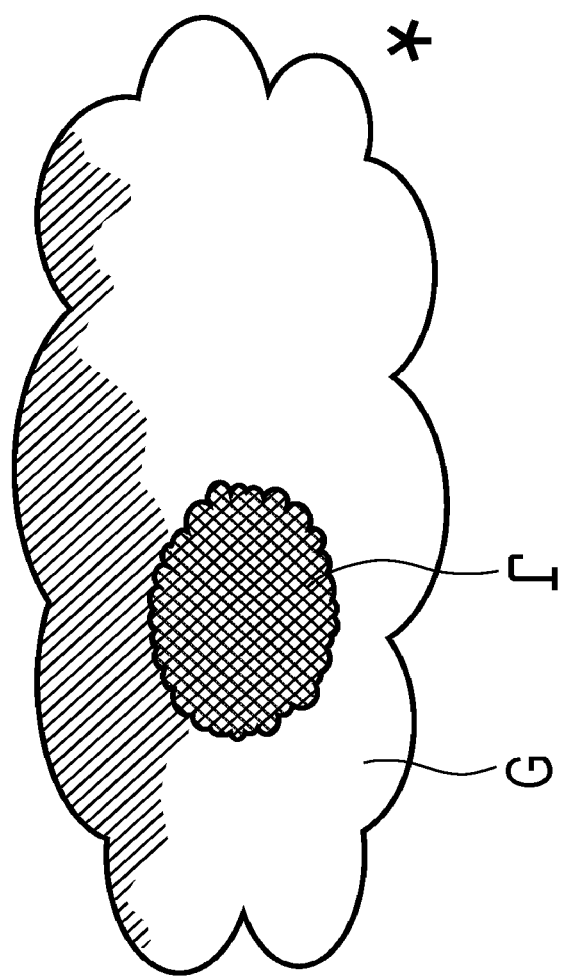
FIG. 3 depicts a basic network model. Graph G is a random ER graph where any pair of vertices are connected with probability $p_0$. Subgraph $\Gamma$ constitutes vertices in a community where they share a common interest or topic and thus have higher connection probability of $p_\Gamma$.

The question remaining is how a vertex i identifies its communities distinctively, i.e. what values of percolation strength p corresponds to distinguishable communities. Returning to the definition of communities as sets of vertices with similar interest or topic and thus higher probability of connection, one may observe that communities will emerge as connected components when varying percolation probability. To illustrate this more consider a simple example of an ER graph, $G(N, p_0)$ of size N with probability $p_0$. A subset $\Gamma$ of nodes form a local community of size M, i.e. each pair of vertices are connected with probability $p_\Gamma \gg p_0$, as illustrated in FIG. 3. Then, Remark 2: For large M and N and percolation threshold of $c/(p_0 N) \gg p_c \gg c/(p_\Gamma M)$, probability of any two vertices i and j belonging to a connected component is one if they belong to $\Gamma$ and is vanishingly small otherwise.

Proof The proof follows directly from property II since the percolation threshold is above the threshold for an ER graph of $\Gamma$ and below the percolation threshold of a global ER graph.

This means that for any vertex i in $\Gamma$, $C_i^P$ is approximately $\Gamma$ for $c/(p_0 N) > p > c/(p_\Gamma M)$ and will include almost all vertices of G for $p > c/(p_0 N)$.

The definition is now generalized to multiple overlapping and non overlapping communities and investigate the behavior of $C_i^P$ in different cases. Consider an ER graph of size N with probability $p_0$ and two subgraphs, $\Gamma_1$ and $\Gamma_2$ of size $M_1$ and $M_2$ and connection probabilities $p_1 \gg p_0$ and $p_2 \gg p_0$ respectively. Define critical percolation probabilities $p_{ci} = c/(p_i M_i)$, i=1, 2. Looking at the connected components as the percolation probability is swept for both overlapping and non overlapping cases, is illustrated in FIG. 4A and FIG. 4B.

For $c/(p_0 N) > p_p > \max(p_{c1}, p_{c2})$ the percolation probability is above subgraph percolation probabilities so using remark 2 almost all the vertices in each community are connected. Now consider two cases:

1. If $\Gamma_1$ and $\Gamma_2$ have overlaps then any two vertices within same subgraph are almost surely connected. So any two vertices in both the communities are connected almost surely. If starting percolation from a node in $\Gamma_k$, it will get back fraction qk of iterations from nodes in $\Gamma_k$, and naively fraction q1q2 of iterations from nodes in other community.

2. If $\Gamma_1$ and $\Gamma_2$ are non-overlapping, the probability of getting from any node in $\Gamma_k$ to any other node when percolating is a non vanishing constant qk. Then the probability of getting from a node i in one community to a node j in another community is then $1-(1-q_1 q_2)^\alpha$ where $\alpha$ is the expected number of edges between two community and in this model is approximately $\alpha = M_1 M_2 P_0$. So any two communities that have strong ties will also connect weakly were the strength depends roughly on number of edges between communities.

The above analysis predicts that $C_i^P$ will have phase transitions at critical probabilities corresponding to communities, which analysis provides a local way of distinguishing communities without any global information.

Local Community Finding

A. Algorithm

The algorithm to find communities for each vertex involves sending a percolation message with percolation probability $p_p$, forming $C_i^{PP}$ for a range of $p_p$ and finding the abrupt change in the community size.

1. Vertex i sends a message with percolating probability $p_p$ with a unique ID identifying iteration;

2. It records the responses and constitutes the set Si pp of the vertices responded;

3. The above task is performed k times and constitutes set Ci pp of all the vertices responding more than kth; and 4. Ci pp is computed for a range of $p_p$ and the abrupt changes in $C_i^{PP}$ are found at percolation probabilities of $p_{pl}$ defining community layer l with strength $p_{pl}$ as $C_i^{Ppl}$.

The above algorithm basically finds nodes with high clustering and strong ties with the source node, while diffusion algorithms try to identify edges with high betweenness and high flow of random walks to find boundaries of communities. FIG. 1 compares diffusion-based algorithms and percolation-based algorithms.

B. Advantages

Using percolation-based algorithms has many advantages over divisive and agglomerative algorithms introduced in the literature. The distributed and parallel nature of percolation search provides a means to locally explore communities for a particular node, called their structure neighborhood [16]. Often in real-world networks communities are not cohesive and have overlaps, in which case diffusion-based approaches fail since there are no separate boundaries for communities to find. The algorithm according to the present invention explores communities and identifies vertices in overlap of communities. Another property of interest in community structure is how strong a vertex belongs to a community and the level of confidence in community structure [21]. A percolation search may be shown to easily provide these statistics by observing fraction of returned messages from a particular vertex. FIG. 1 illustrates the fundamental differences between diffusion- and percolation-based approaches. For a network with n vertices and m edges, other types of community finding algorithms may find community structure in O(md log(n)) [4] where d is the depth of community dendrogram. However, one needs to process the whole graph to capture community structure of a particular node.

Community Finding

In the previous section we discussed a local and distributed algorithm to find communities of a single vertex. In this section we generalize this method to find the community structure of the graph, usually called community dendrogram. In this case the dendrogram is not a simple tree since communities may overlap.

The first approach to create community structure is to define the non-symmetric distance d(i,j) between vertices as:

$$d(i,j) = \begin{cases} o, & j \notin C_i^{Ppl} \forall l; \\ \max_m(Ppm), & m: j \in C_i^{Ppm}; \end{cases}$$

Then classical clustering approaches may be used on this distance matrix to find the partitioning of nodes into communities. [25].

Since the local community finding algorithm finds major communities, taking advantage of this the present invention includes a global community finding algorithm that merges the individual vertex community finding results. This algorithm has several advantages over previously proposed algorithms. It is more robust since it merges the communities over several vertices. It allows overlap of communities and purge weak and insignificant communities automatically.

Community Finding Algorithm

For each community pair ($C_1$, $C_2$). We then have:

$n_{1,2} = |\{(i,m)|(i,m) \in C_1, (i,m') \in C_2, m > 0.25_{m1}, m' > 0.25_{m2}\}|$ $n_1 = |\{(i,m)|(i,m) \in C_1, (i,m') \notin C_2, m > 0.25_{m1}\}| + |\{(i,m)|(i,m) \in C_1, (i,m') \in C_2, m > 0.25_{m1}, m' \leq 0.25_{m2}\}|$ $n_2 = |\{(i,m)|(i,m) \notin C_1, (i,m') \notin C_2, m' > 0.25_{m2}\}| + |\{(i,m)|(i,m) \notin C_1, (i,m') \notin C_2, m \leq 0.25_{m1}, m' > 0.25_{m2}\}|$ Where $m_i$ is the number of times community i has been merged. The similarity measure, $\psi_{1,2}$, is then defined as $(n_{1,2}-(n_1+n_2))/(n_{1,2}+(n_1+n_2))$.

1. For each vertex i in the network perform the local community finding algorithm to get different levels of communities $C_i^{Ppl}$ cor-responding to percolation probabilities $p_{pl}$. Normalize it by $M = \max(m)_{\forall (j,m) \in C_i^{Ppl} j \neq i}, \text{Set}(i,m) = (i,1).$ 2. Find the community pair $C_l$ and $C_k$ that have maximum similarity $\psi_{max} = \max_{i,j \psi_{i,j}}$, if $\psi_{max} < 1/3$ go to 3.

3. Merge community $C_l$ into $C_k$ and set $m_k = m_k + m_l$
Results
4. Normalize each remaining community $C_k$ by $$(i,m) = \frac{(i,m)}{\max(k,n) \in C k}(n).$$

To further benchmark an algorithm according to the present invention, the results with a number of randomly generated graphs and social and biological networks used to measure performance of previous community finding algorithms [9, 12, 15] are compared.

A. Randomly Generated Network

An algorithm according to the present invention is applied to two sets of randomly generated graphs. To benchmark the algorithm a traditional synthetic ER graph proposed in [9] is used. Then an overlap model of randomly generated graphs is used to demonstrate the advantages of proposed algorithm compared to partitioning algorithms and in particular to the fast community finding algorithm proposed in [9].

1. Random Non-Overlapping Communities.

Figure 5A:
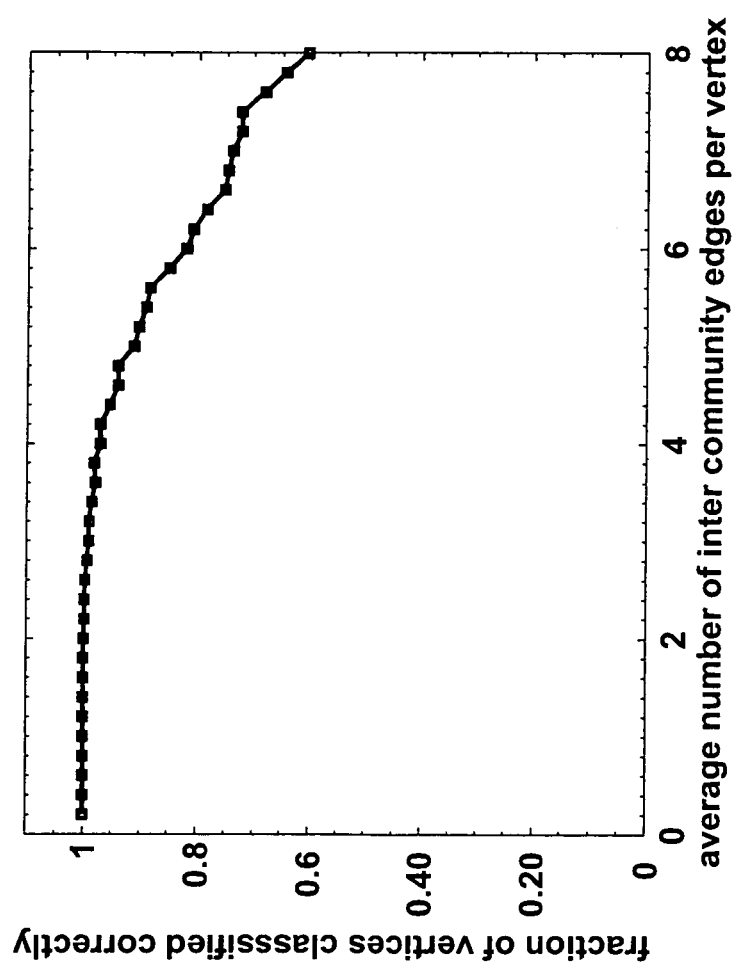
FIGS. 5A-5B show synthetic random graph models.
Figure 5B:
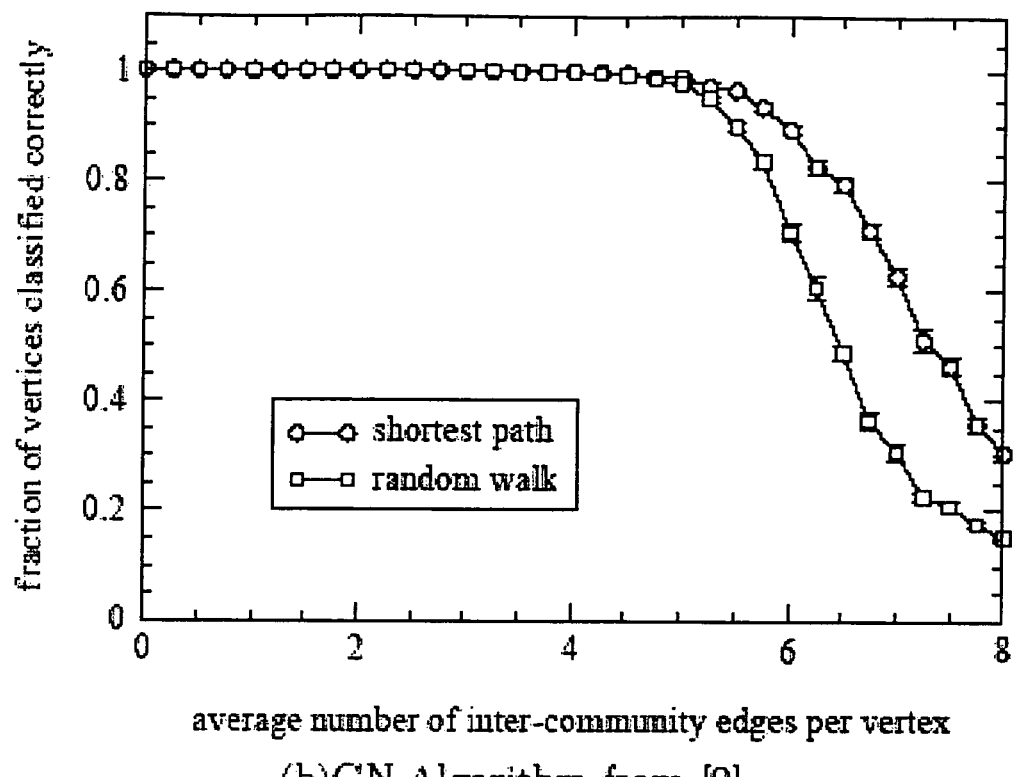

A large number of graphs of size N=128. were generated and divided into 4 equal-sized communities of 32 vertices each. Any two vertices within the same community is connected with probability $p_1$ and between different communities with probability $p_0$. So that expected degree of vertices is 16. The performance of the community finding algorithm to find the communities, for different values of intra-community edges was examined. FIG. 5 shows the percentage of the vertices classified correctly for a range of intercommunity edges. The results are bench-marked with similar experiments with other algorithms. FIG. 5 shows that proposed algorithm works as well as a GN algorithm for small number of average inter-community edges per vertex and works considerably better for large values of inter-community edges inasmuch as the GN algorithm fails to detect communities because the number of edges inside a community and the number of edges to outside of the community is close. The algorithm according to the present invention detects communities with less precision since edges to outside of the community are randomly distributed over the network while inside edges form a clustered set of vertices that are more interconnected.

2. Random Overlapping Communities

While the previous example benchmarks performance of a community finding algorithms on random graphs, often in practical networks communities are not well separated as modeled in the previous model, but rather real life communities have overlaps, i.e. some of the nodes have strong ties to more than one community. One of the advantages of proposed algorithm due to its localized approach is that it may correctly identify overlapping communities, while traditional partitioning algorithms partition overlap vertices into one of the communities. Further enhancements of the GN algorithm propose to capture such behaviors by randomizing the partitioning steps [21].

Figure 6A:
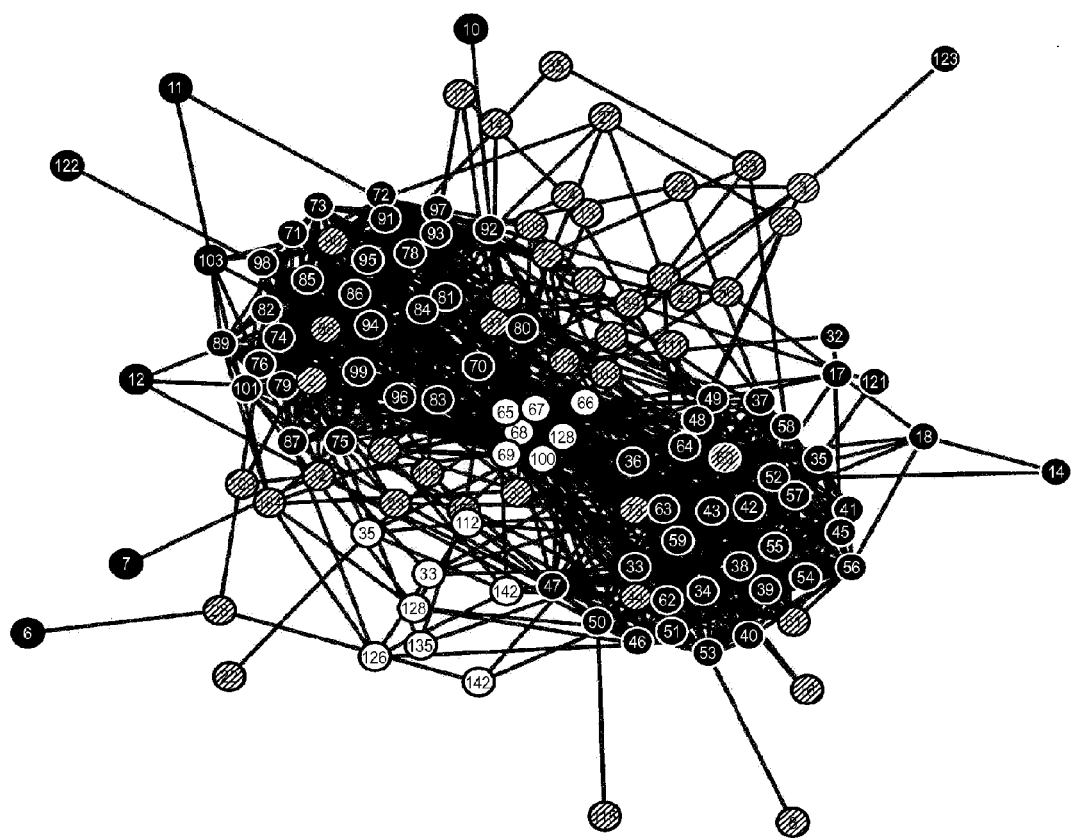
FIGS. 6A-6C: illustrate use of a local community finding algorithm on randomly generated overlapping communities. Traditional partitioning algorithms including GN algorithm fail to identify the overlap and partition the common vertices to one of the communities. Percolation community finding identifies both communities and nodes in overlap.
Figure 6B:
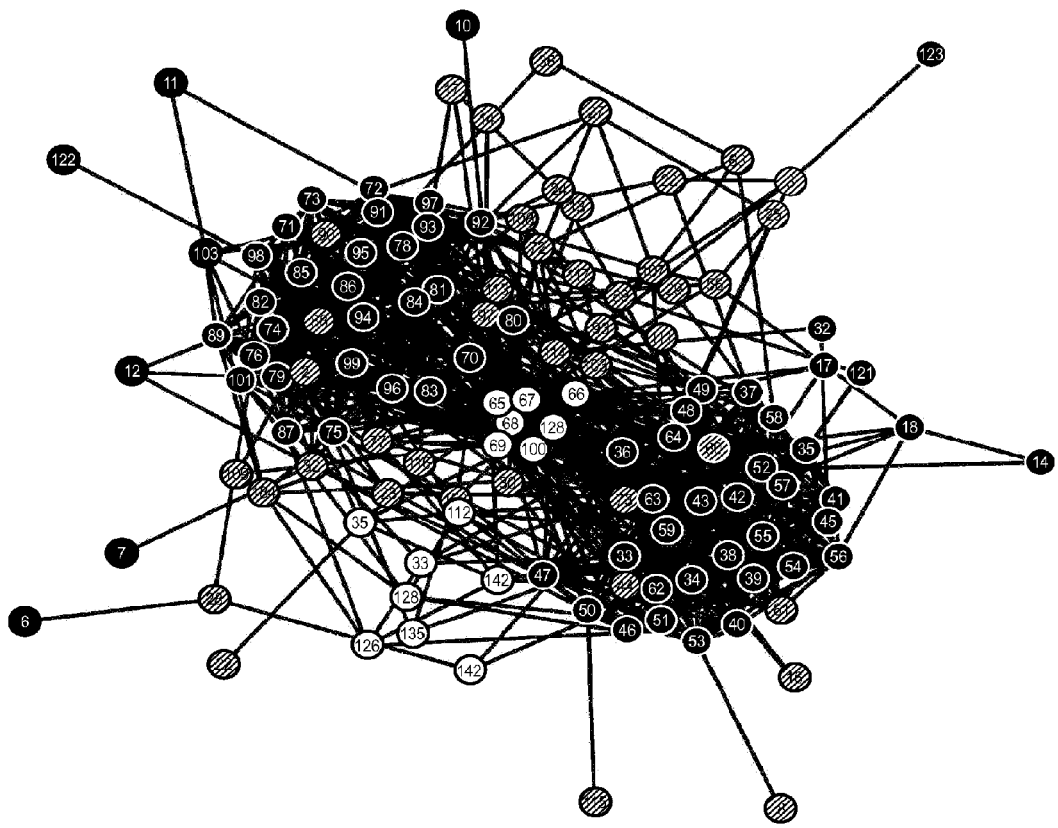
Figure 6C:
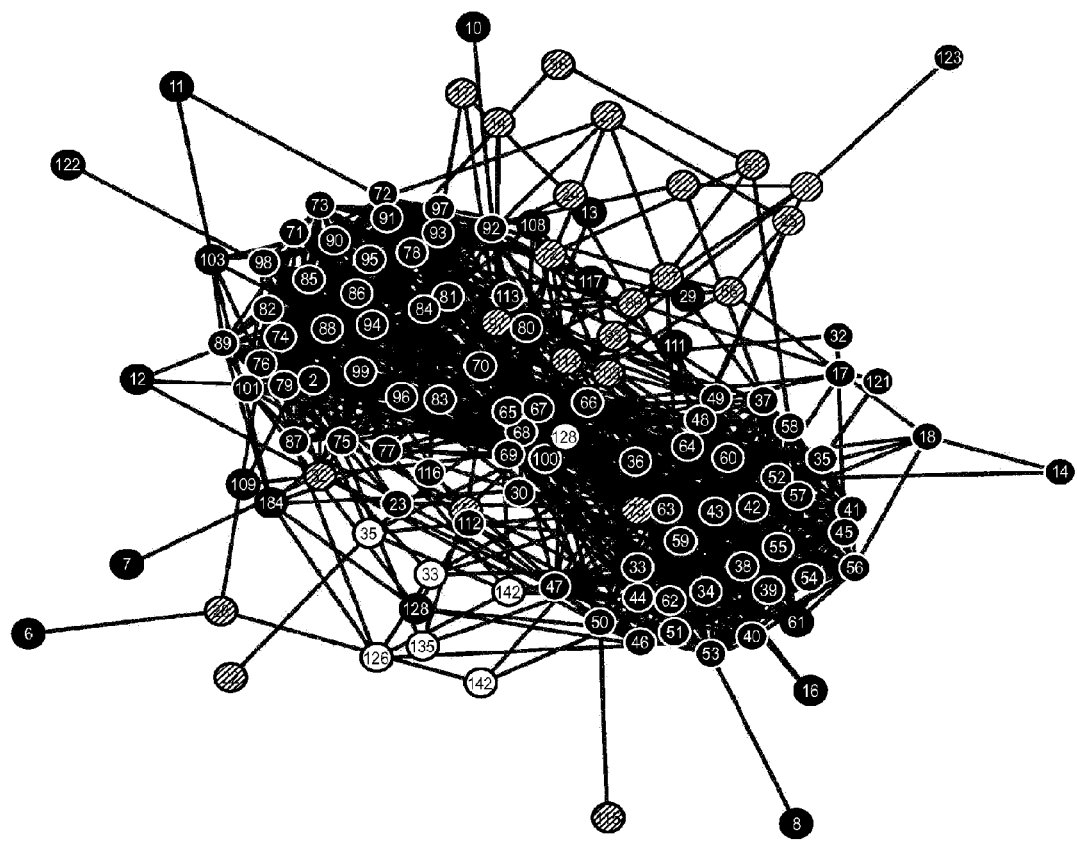

Considering a randomly-generated graph with 128 vertices, each random vertex has 2 random edges on average. Two communities of size 37 exist where each node has on average 14 random edges inside the community. The two communities also have 5 nodes in common, as shown in FIG. 6A. Both a GN fast community finding algorithm and percolation community finding algorithm were applied. The GN method partitions the common vertices into one of the communities, as shown in FIG. 6B, while the method according to the present invention identifies communities and includes overlapping vertices in both communities, as shown in FIG. 6C. Using the method according to the present invention, only a few nodes are misclassified, while using the GN method several more nodes are misclassified.

B. Zachary Karate Club

Figure 7A:
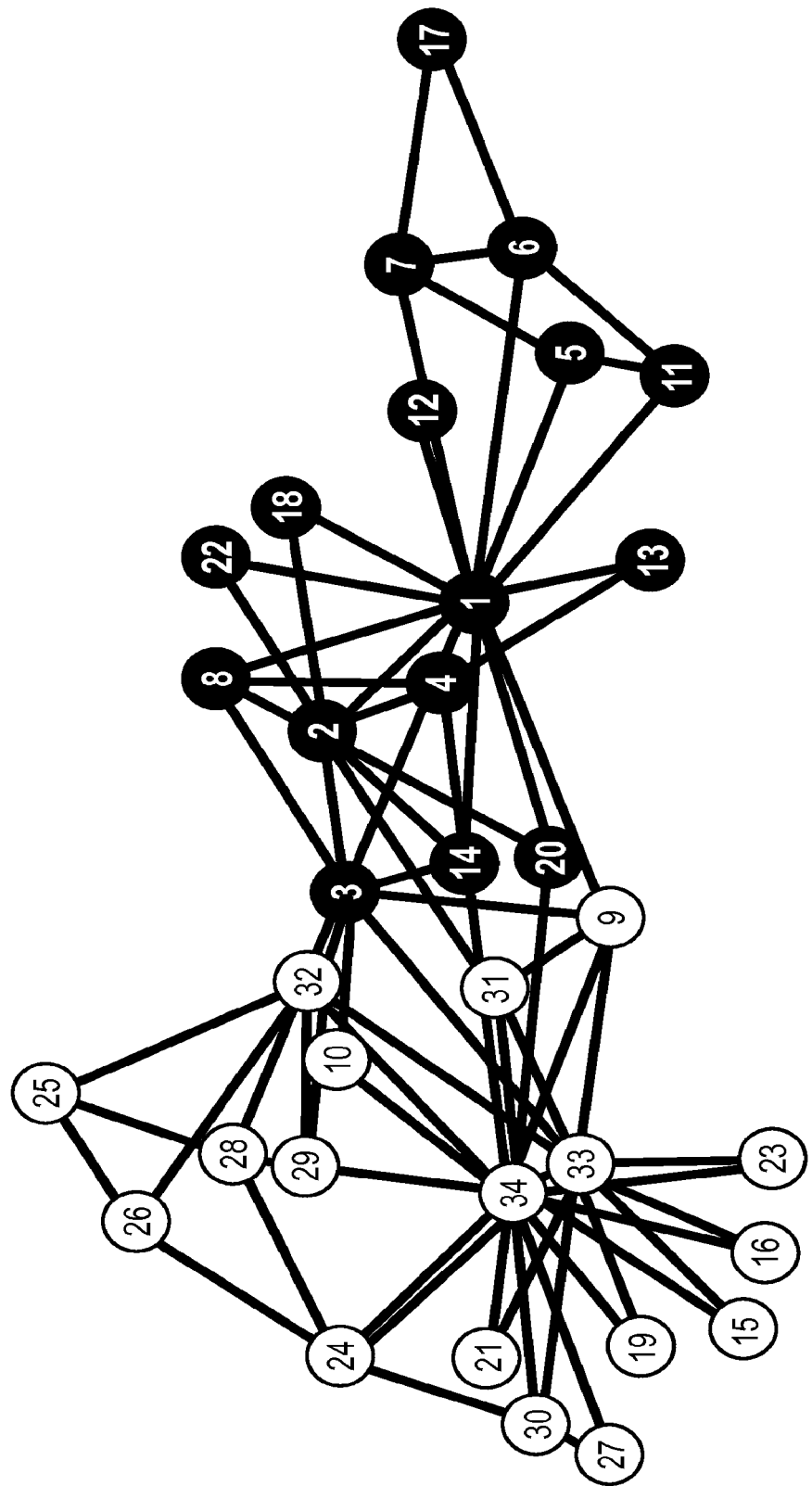
FIGS. 7A-7D illustrate operation of a local community finding algorithm on administrator (1) and instructor (33) and high degree node (34). The detected nodes are in blue and the node sizes are proportional to how strong they belong to the community.
Figure 7B:
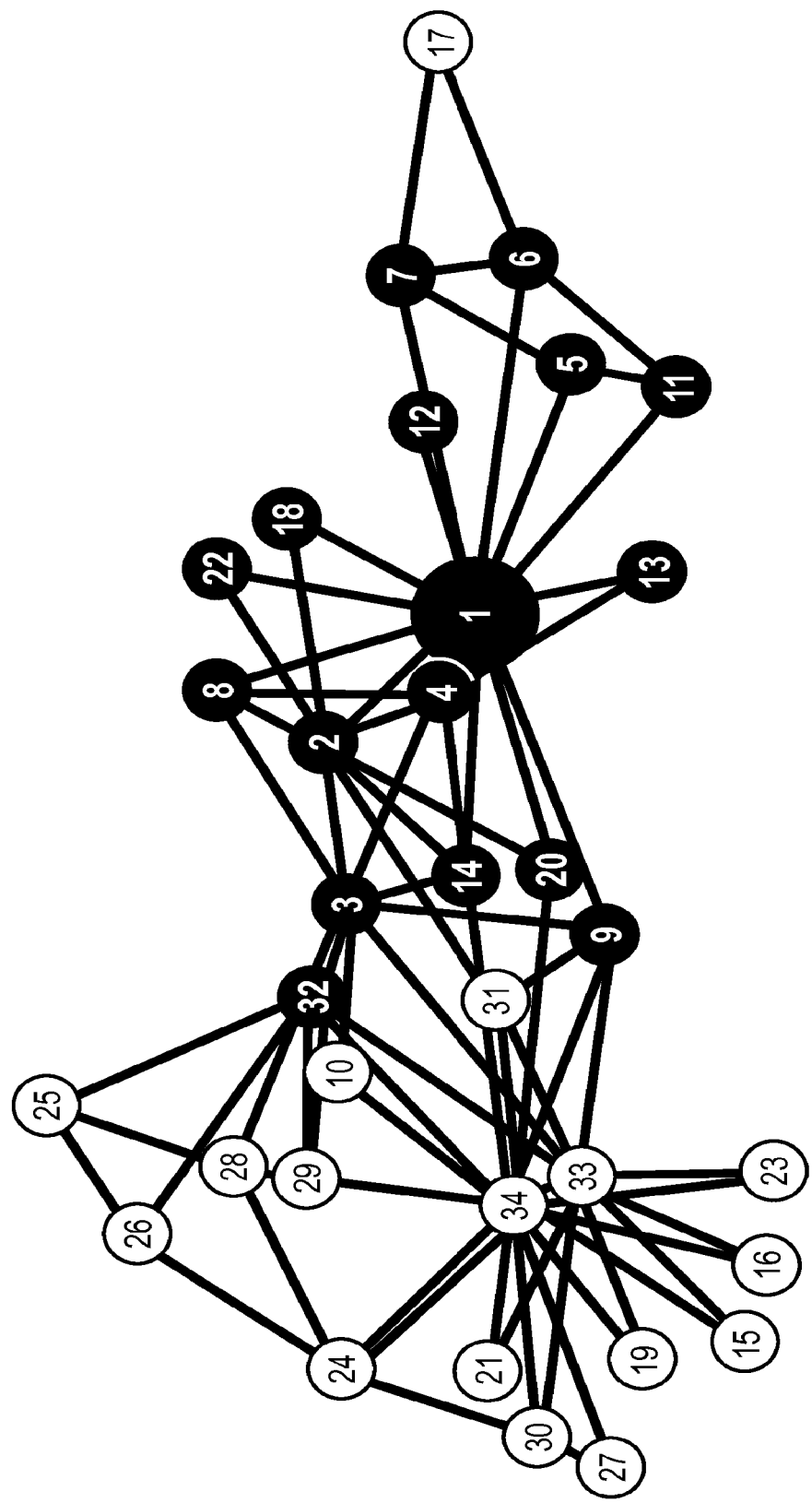
Figure 7C:
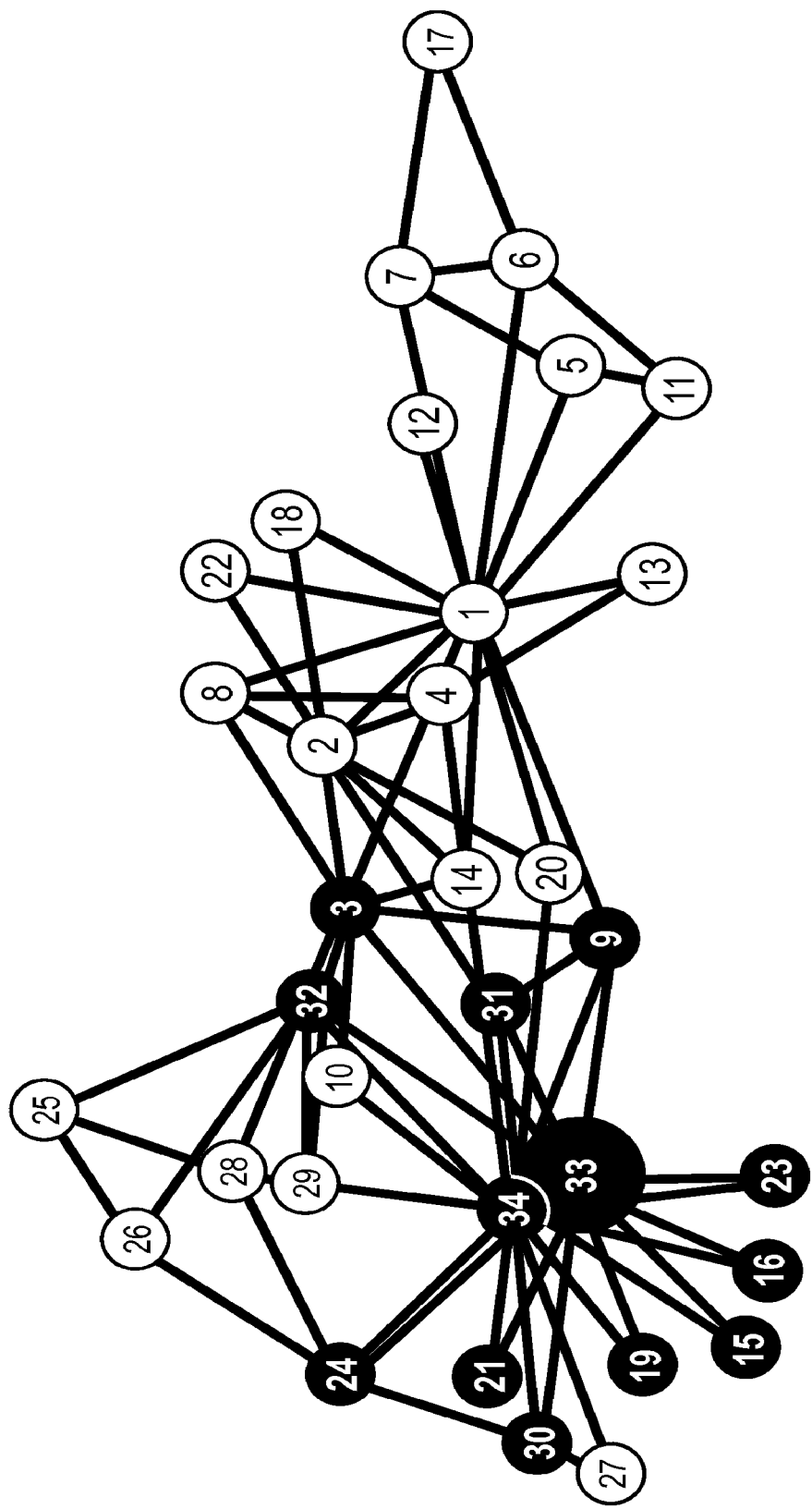
Figure 7D:
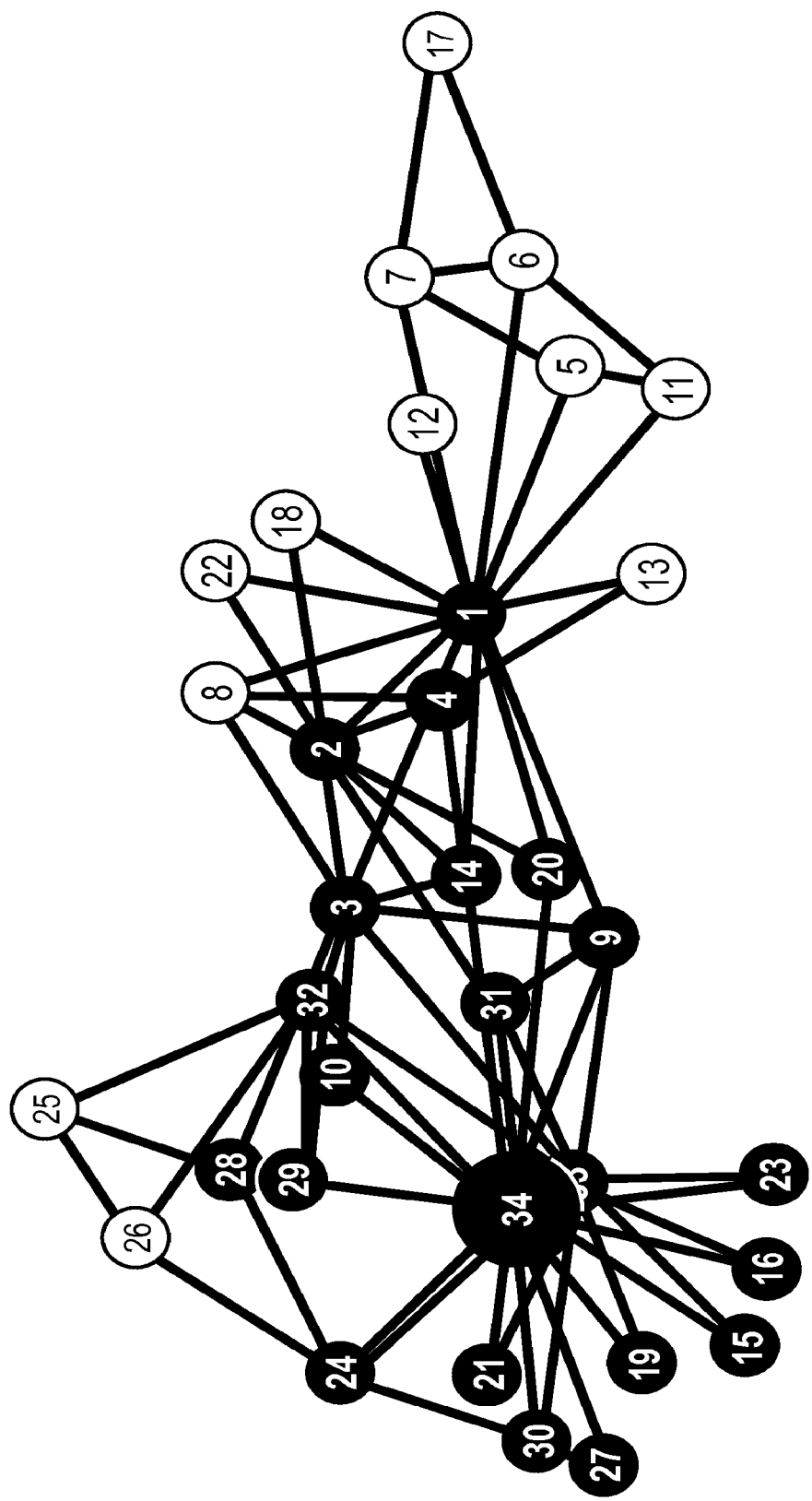
Figure 8:
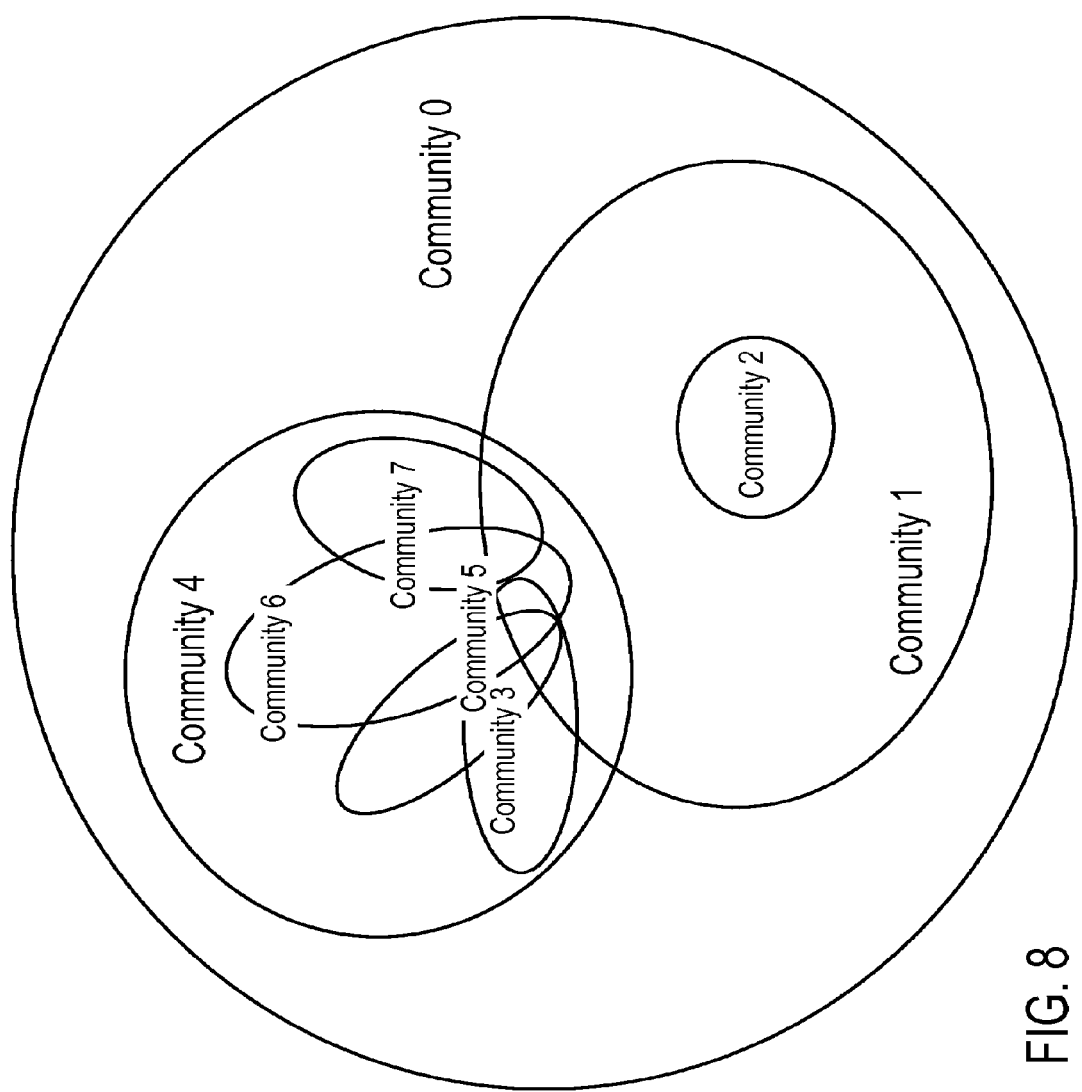
FIG. 8: depicts a community finding algorithm finding two major communities and 5 other smaller overlapping communities.
Figure 9A:
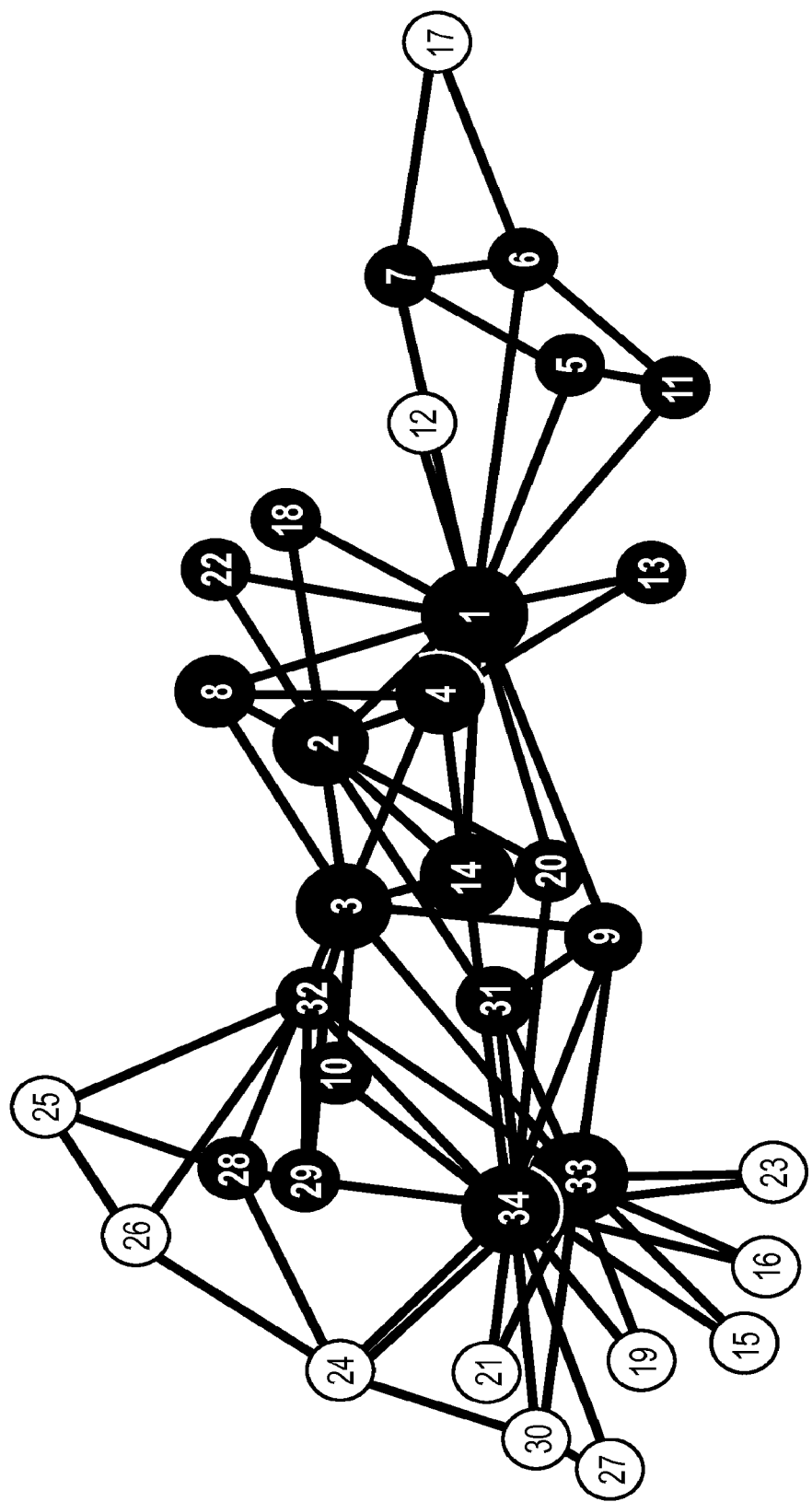
FIGS. 9A-9G show communities.
Figure 9B:
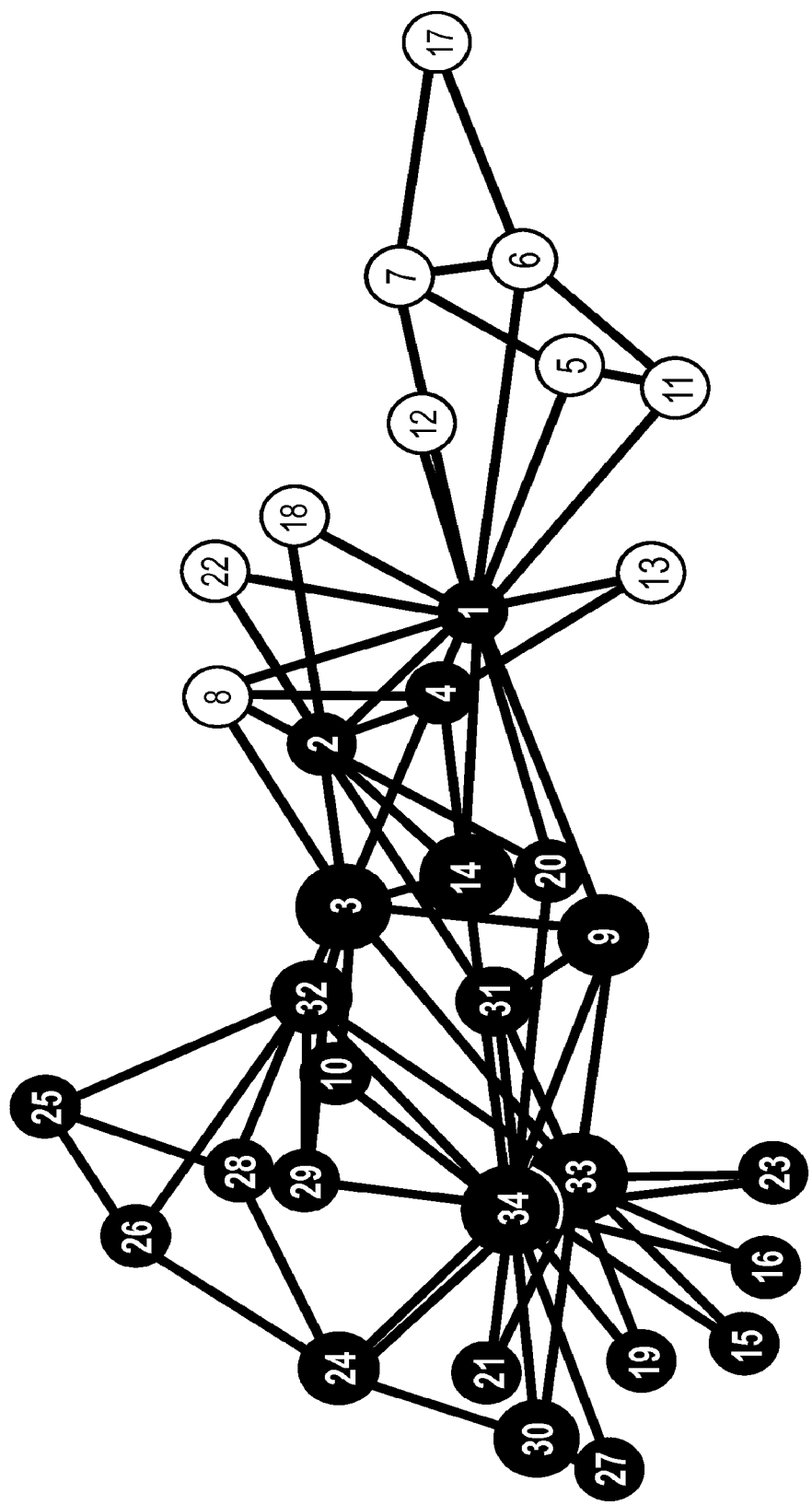
Figure 9C:
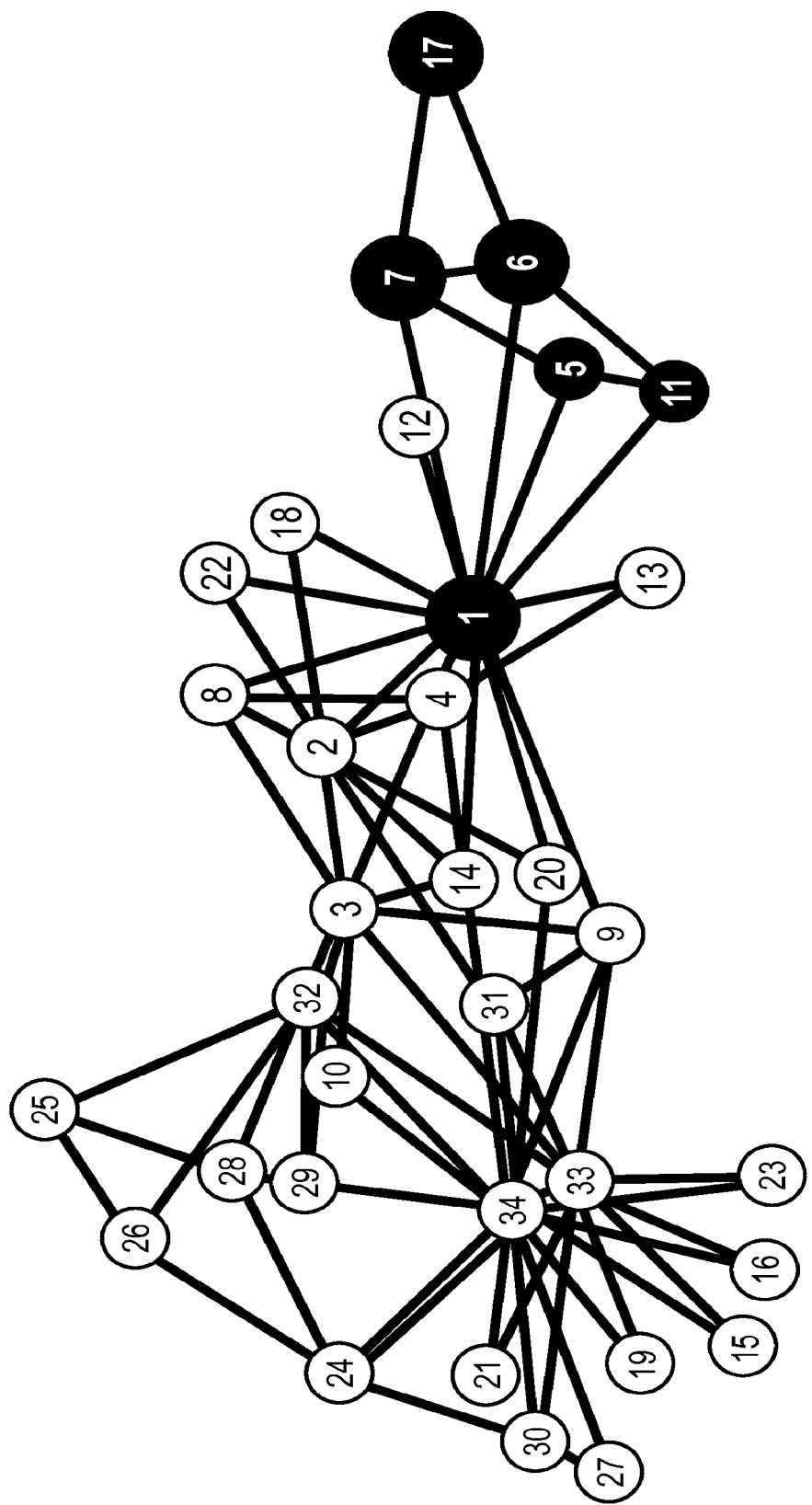
Figure 9D:
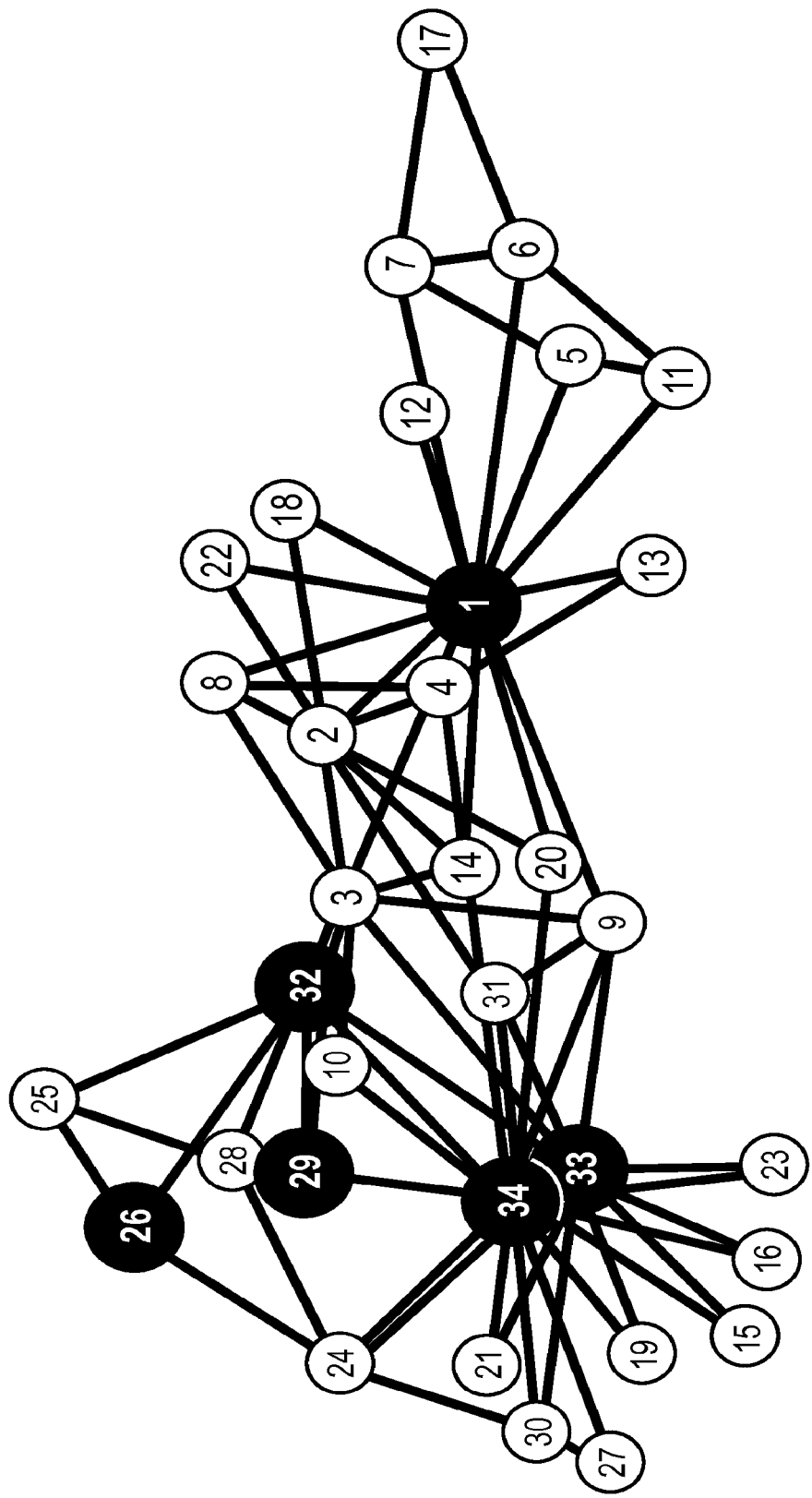
Figure 9E:
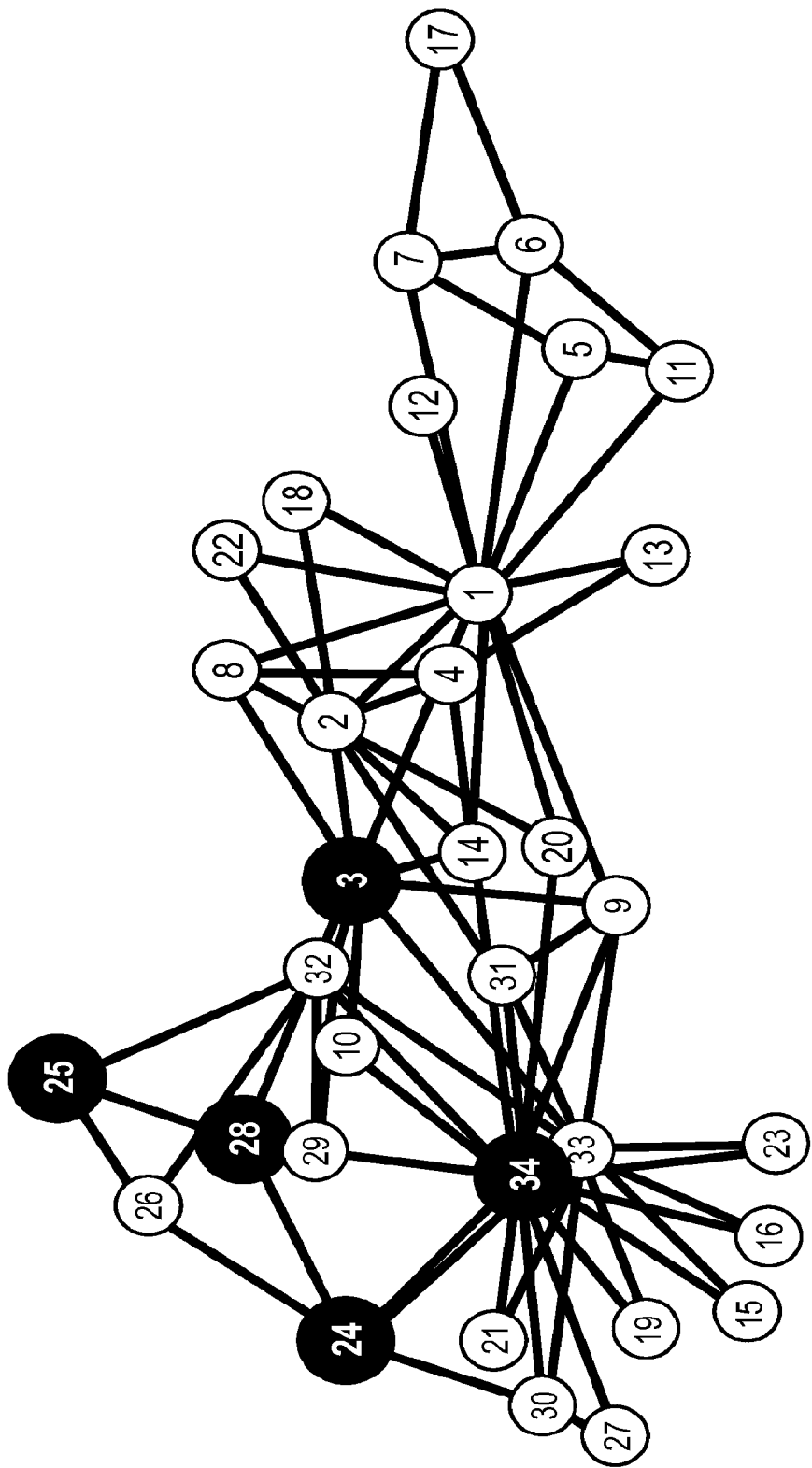
Figure 9F:
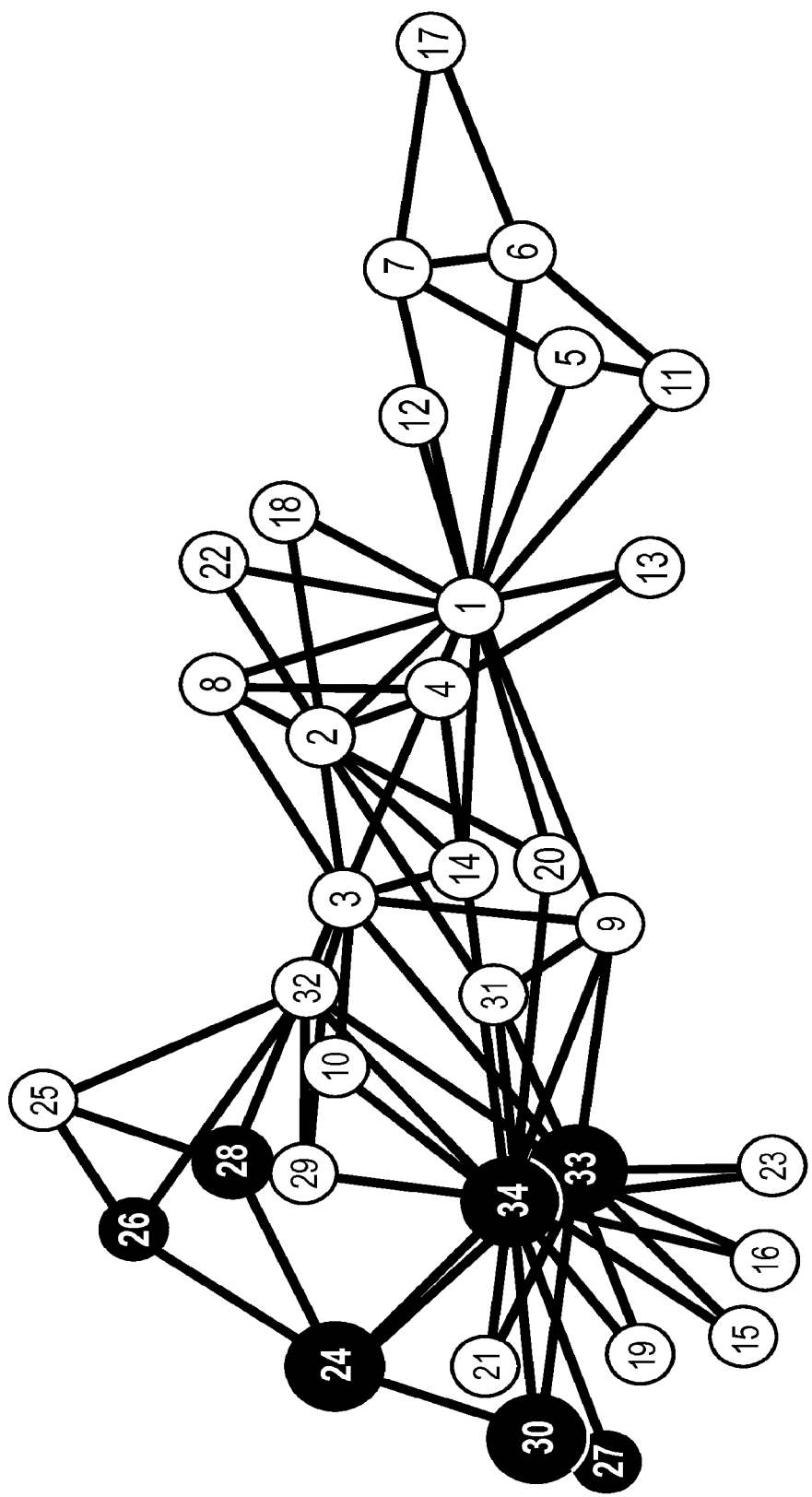
Figure 9G:
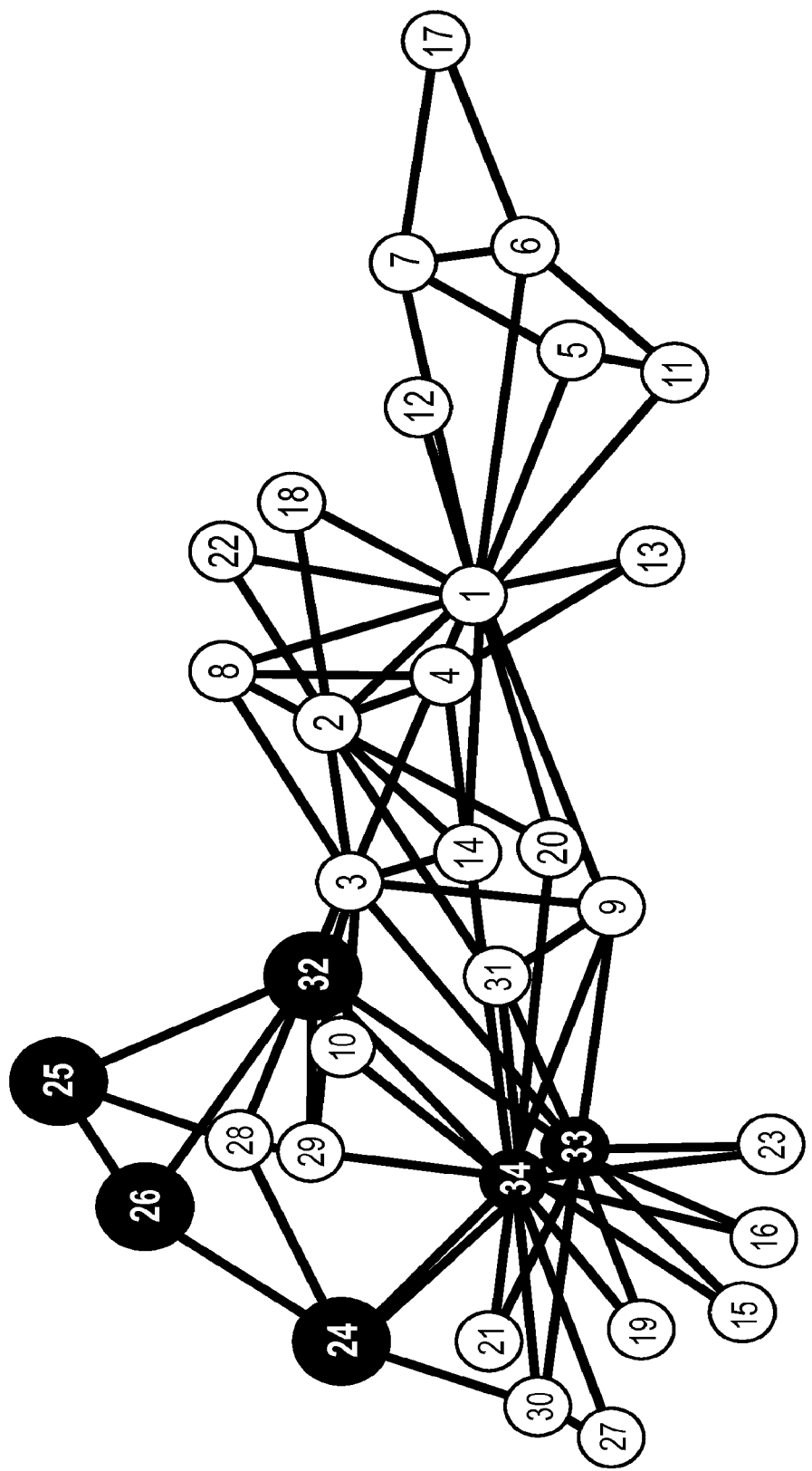

The local community finding algorithm according to the present invention has been applied to the Zachary karate club network[22]. This undirected graph has been used extensively in previous literature [9, 12, 15] for algorithm benchmark. Zachary recorded the contacts between members of a karate club over a period of time. During the study, after a fight between owner and trainer, the club eventually split in half. The original network and the partitioning after split is depicted in FIG. 7A. The local community finding algorithm according to the present invention was applied for three important nodes in the network. Nodes 1 and 33 represent the administrator and instructor respectively, and node 34 represents a high degree node with close relations with node 33, see FIG. 7. Note that the notion of community used herein is different from that of [9] and hence the outcome is different. The algorithm according to the resent invention looks for closely connected nodes in a cluster. Identified communities clearly have overlaps. The sizes of the nodes are proportional to their strength in the community. FIG. 7B shows the local community finding for node 1. As expected, node 17 is singled out since it does not have strong ties to the community. FIG. 7C shows the local community finding result for the instructor. Node 27 has been singled out of the community since it does not have strong social connections with the community. Also, nodes 10, 25, 26, 28, 29 were singled out. FIG. 7D shows the community for node 34 and it shows that it also includes the administrator. Note that although percolation probability is symmetrical, i.e. the probability of node i and j being in the same connected component, the inclusion in the community is not symmetrical and node 34 is not included in community of node 1. The reason is that the community threshold is different for the two depending on network neighborhood. The community structure finding algorithm was also applied. Seven overlapping communities were identified. FIG. 8 shows the schematic of the relationship between detected communities. Two major communities are represented in FIG. 9. Again the sizes of the nodes represent their strengths in the community. The algorithm is able to identify the communities correctly and further identify the role and strength of each node in the community. Several nodes are clearly in the overlap between the communities as they have weak ties with both communities. As expected, nodes 1 and 34 are in the both the communities because of their close social connections with both communities, and node 12 has been excluded from the administrator community because it only has a single connection to node 1.

In the present description, a new distributed algorithm for finding communities of a vertex in a localized fashion is disclosed. It exploits social definition of a community has highly interconnected set of vertices. The algorithm according to the present invention is generalized to achieve a list of the communities for a network. It is shown how this algorithm has superior performance over previous algorithms by allowing overlap between communities and robustness to network perturbations. The algorithm may be further optimized by taking advantage of the fact that strong nodes in a community have similar local communities, and so complexity of the algorithm may be reduced by removing this computational redundancy.

Figure 10A:
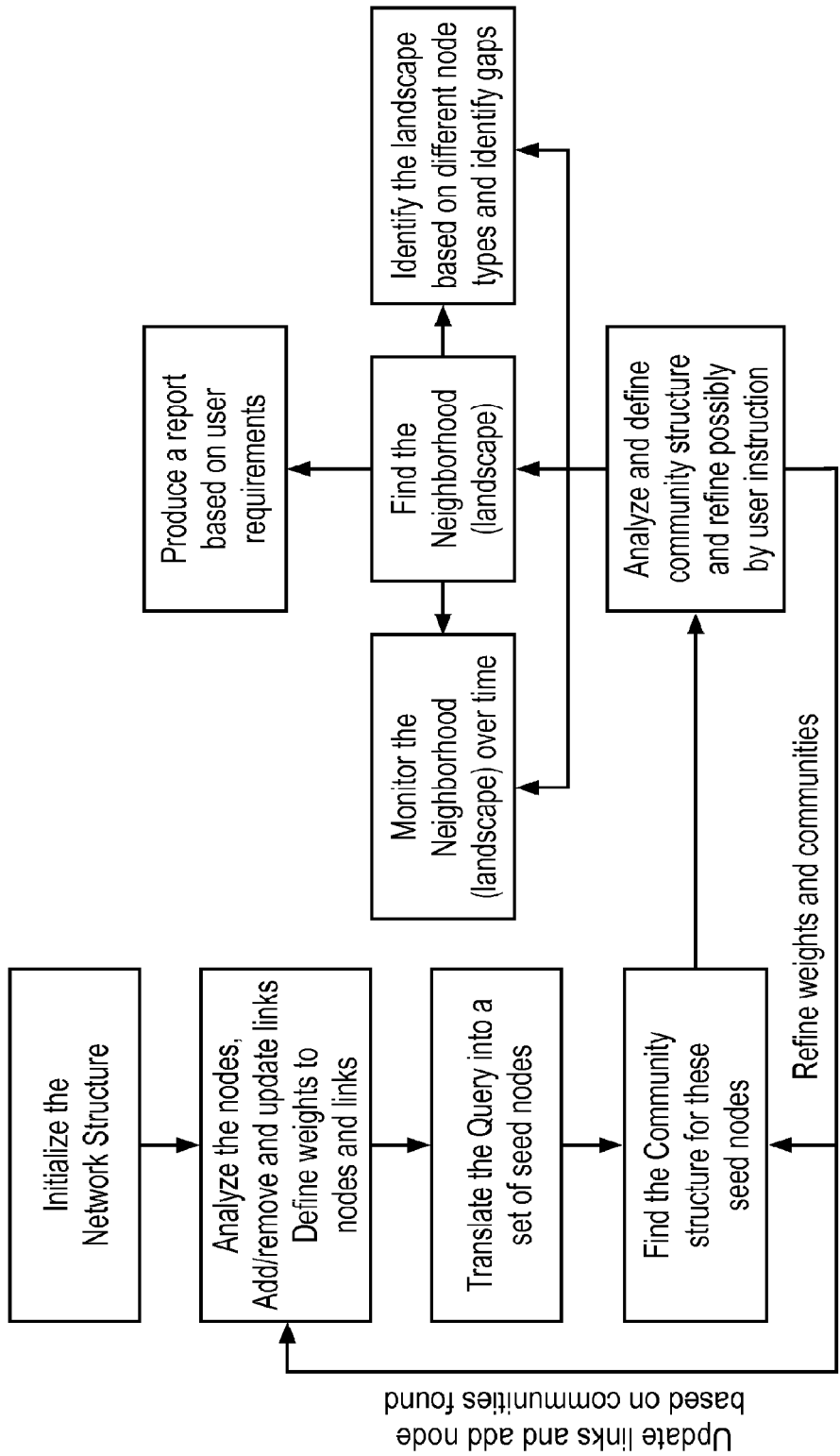
FIGS. 10A-10C depict flow charts.
Figure 10B:
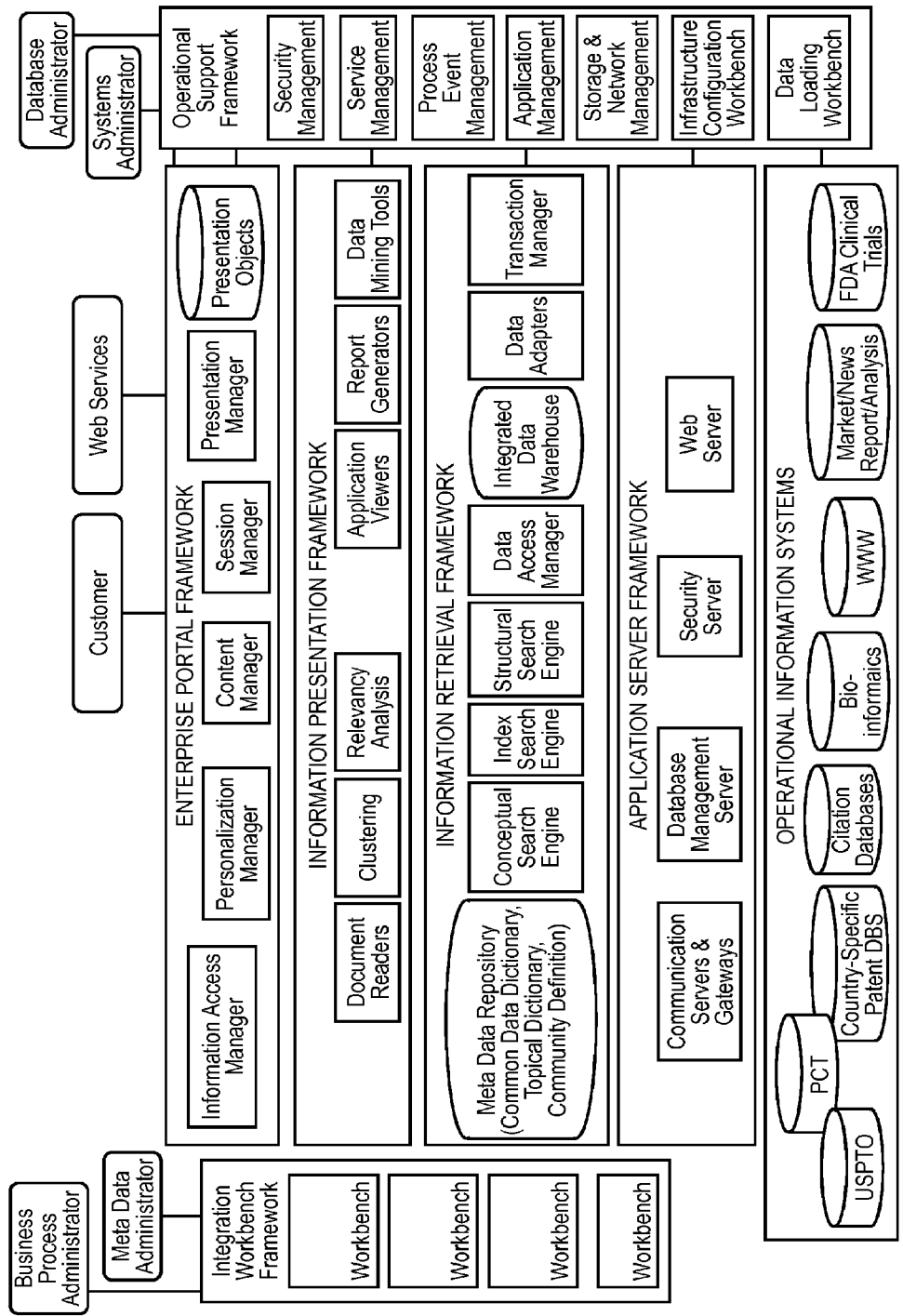
Figure 10C:
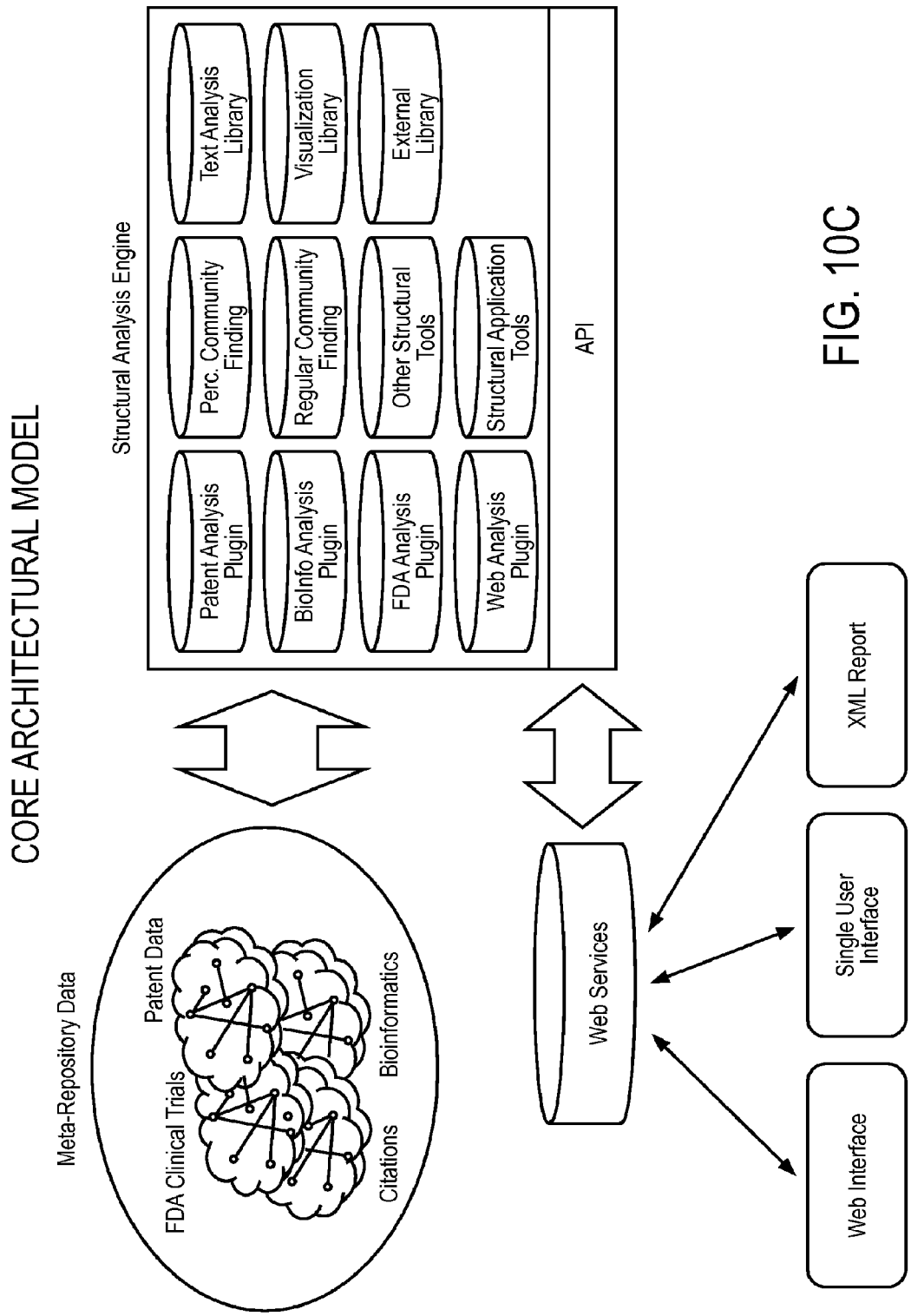

Variations in the basic algorithm include:

1. Starting from a set of seed nodes instead of a single node
2. Instead of defining a global and uniform percolation probability, each node i is assigned a weight between 0 and 1 as $W_i$. Each edge between nodes i and j may also be assigned a weight between 0 to 1 as $W_{i,j}$. Then each node instead of passing the message with Percolation probability $P_{Perc}$ it passes the message with a probability as a function of $f(P_{Perc}, W_i, W_{i,j})$ for example it may be PPerc*Wi*Wi,j
3. Nodes and links may have different types and each type may have a predefined weights.
4. Weights of different links may be trained and adjusted for a particular user depending on the usage pattern or concept. For example, for a user searching for biotechnology, weight of the nodes in other concepts like food industry could be reduced
5. Sweeping over percolation probability may be optimized by doing a quick search over this metric.
6. Result of the community findings may be used to adjust link and node weights The present invention has a broad scope of applicability to almost any collection of data. FIG. 10A depicts a generalized system flowchart of a generalized process according to the present invention. The flowchart includes forming the network, assigning different weights, and performing local community finding on the network. This process is refined by feedback to adjust weights and modify nodes based on query, community results and/or user feedback. FIG. 10B illustrates a system architecture reference model; The system includes different layers. Meta-data is imported from various operational information databases and is organized and processed into a meta-data repository. Different information retrieval components are used to analyze the data for particular applications. Customer and web services access an enterprise portal network with general interfaces to make queries and receive results processed by an information retrieval framework and refined information presentation framework. FIG. 10C illustrates a core architectural model according to the present invention wherein a meta-data repository consists of analyzed linked storage of different types of data as discussed with respect to the system architecture. Different plug-ins may be used to interact with structural analysis engines to answer queries. A standard command/report API is used to access the system through web services.

It may be applied to documents, such as papers, patents, FDA clinical trials documents, product descriptions, news reports, market analyses, analyst reports, business reporting information, and any combination or permutation thereof. It may also be employed in applications for analysis of the World Wide Web, Email and spam filtering. The present invention may also be applied to pattern detection in biological networks, such as transcription regulatory networks, social networks and communities, for example for military and homeland security applications.

Figure 11A:
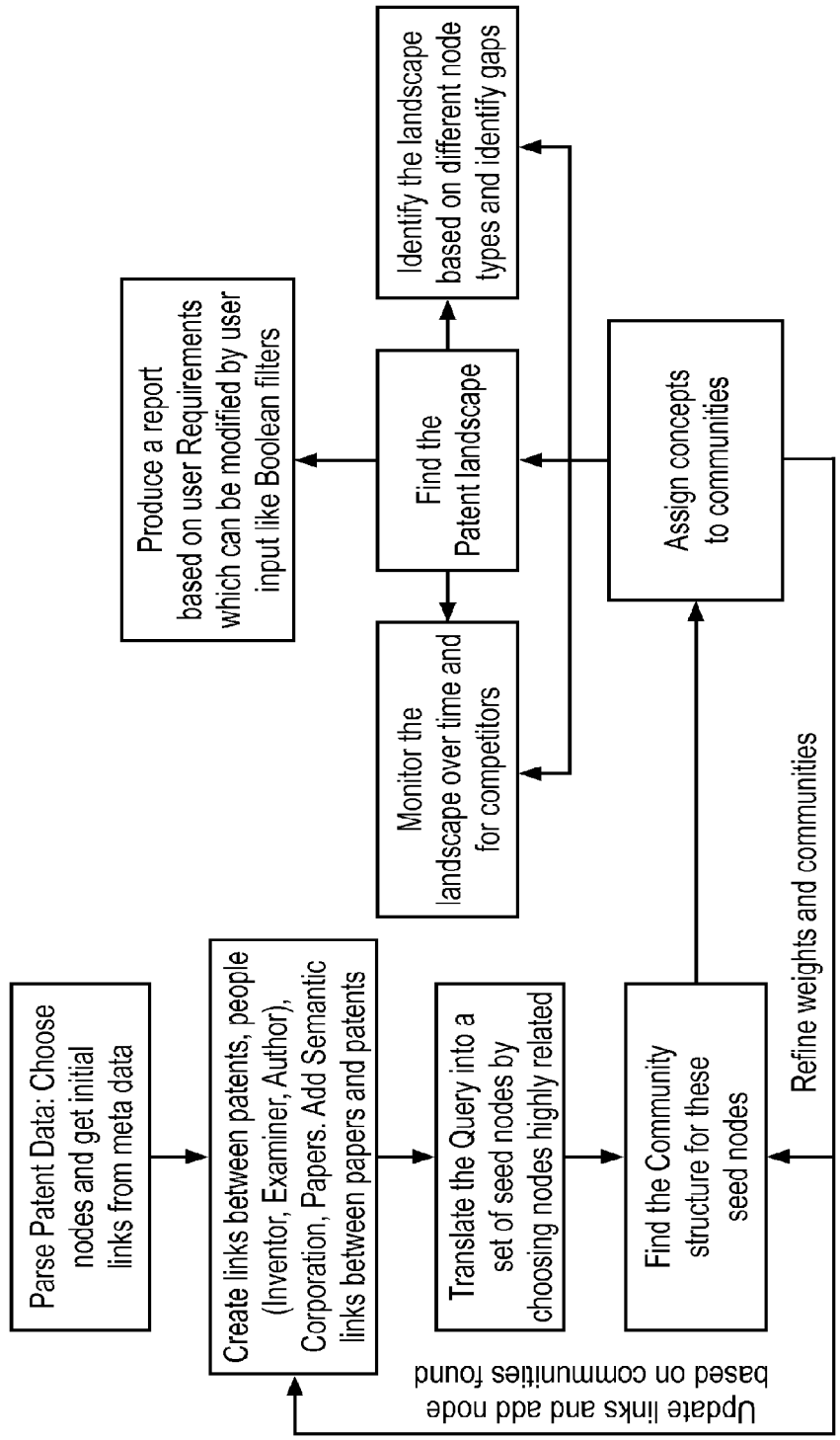
FIGS. 11A-11C illustrate system flowcharts for application to a patent database.
Figure 11B:
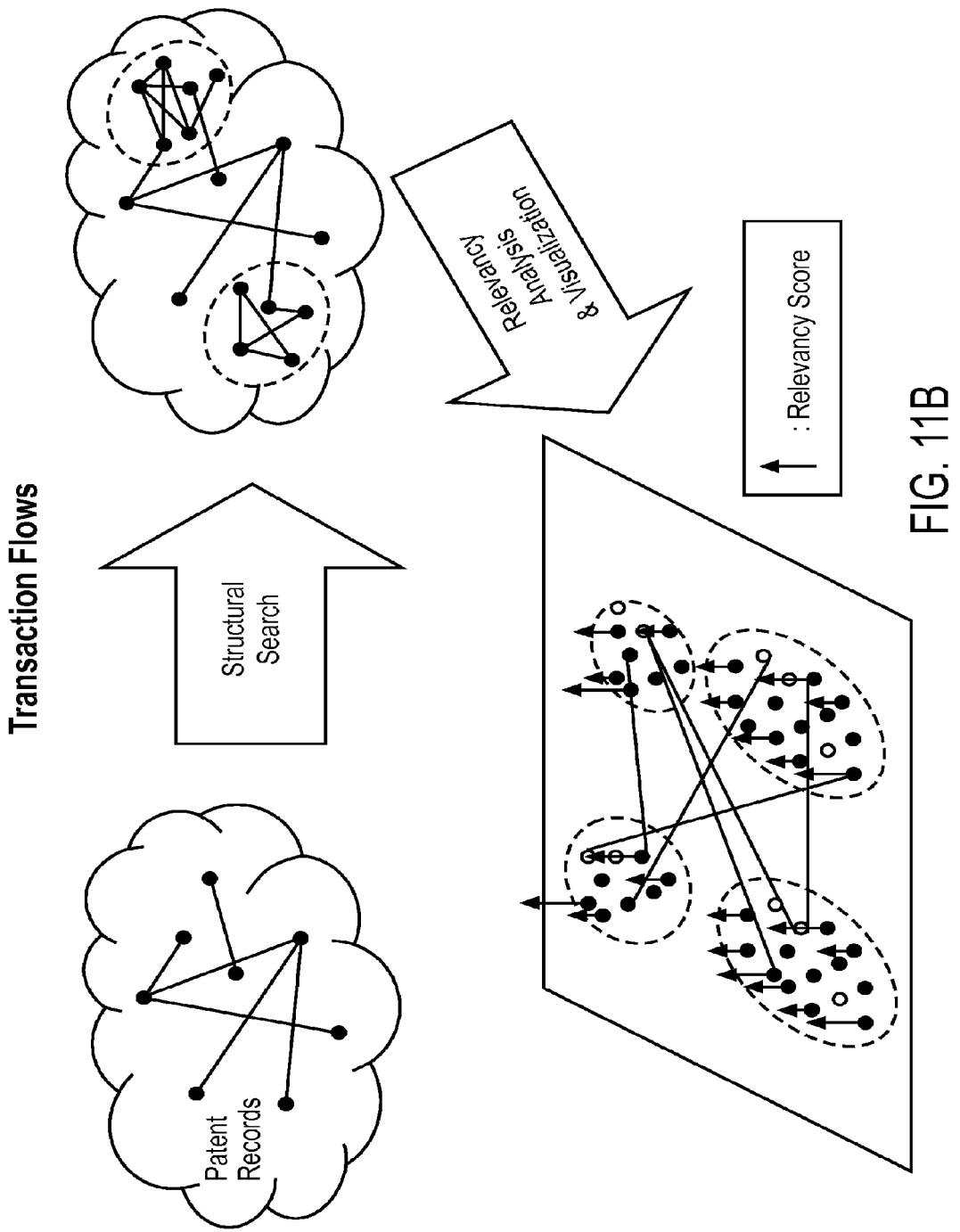
Figure 11C:
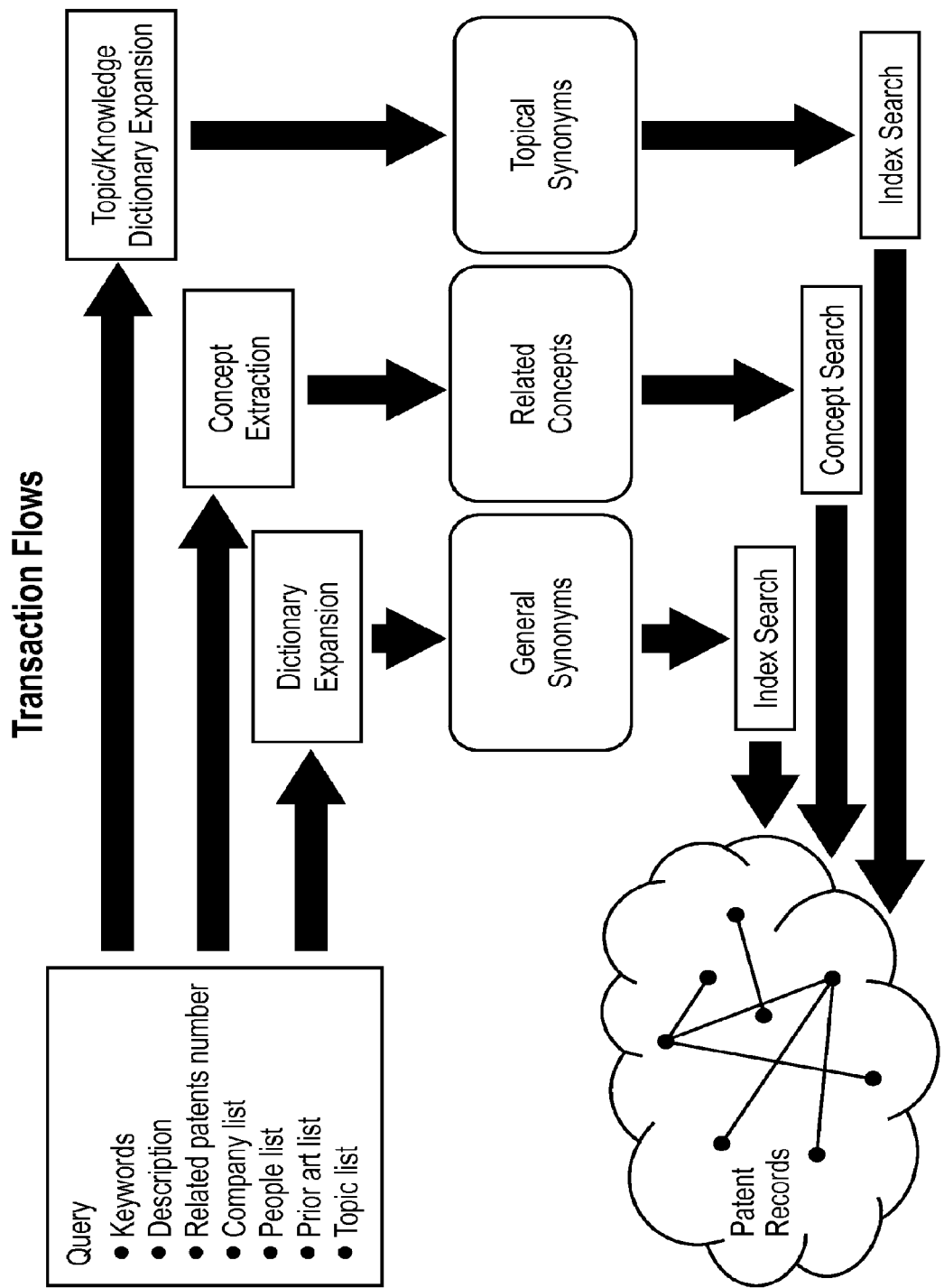

In a patent: finding landscape, the present invention may be used to analyze competitors and to monitor those competitors with a watchdog capability by flagging results of ongoing analyses of companies, concepts, and technologies. FIG. 11A illustrates a system flowchart for application to patent information. The results are refined by feeding back the user adjustments of results to a meta-data repository. FIG. 11B shows transaction flows prior to application of an algorithm according to the present invention. FIG. 11C shows transaction flow with application to landscape analysis of patents using an algorithm according to the present invention.

The present invention also enables a user to browse through communities and fine-tune the results with a simple binary filter. In application to market analysis, the present invention may be used to provide a portfolio for different sections of the market in terms of competitors, technologies, latest news and technical papers and publications. Gaps between communities, and hence opportunities not covered by competitors, may be discovered by examining inter-community relations.

The present invention may be used to find the web neighborhood of a website, its impact and links and communities on the web. It may also be used to monitor the neighborhood change over time. The present invention also provides an email and spam filter by providing a method to reduce spam and deliver messages only from the people relevant to an address.

Recently the problem of unsolicited commercial email or spam has been identified as an ubiquitous problem with email. The present invention provides a more general framework of cybertrust which not only provides a solution to the spam problem, but also restricts email access to trusted individuals. A new distributed method may be based on percolation theory for identifying individual users local network trust in cyberspace using simple local interactions. Recommendation and social connections are used in daily activities to identify trust and reliability. Adopting the same social approach, percolative communication of email messages and limiting interactions to social contacts restricts communication to locally trusted overlapping of communities. The method according to the present invention further exploits the properties of social networks to construct a distributed web of trust based on a user's personal email network to simultaneously prevent spam emails and emails from unwanted sources. The algorithm represents a new paradigm for email communication that proves superior to simple white-list/black-list approaches.

The problem is not just spam, the problem is the user receiving email from the people the user doesn't know. Many people simply discard an email if it is not from their contact list or unless somebody introduces them through an email (CC). This notion of online recommendation may be generalized according to the present invention and made invisible and intuitive. The method according to the present invention may be combined with Bayesian and text based filters.

Behind the implementing algorithm is the present invention of applying percolation to overlapping communities for a user. The header of the email is changed so that it includes current receiver (To) and final destination (Final-To). Then upon receiving an email, if the final destination is the user, it is delivered to the user's inbox else if Current destination is me and time to live of email is less than some threshold I forward it to people in my contact list with forwarding probability P. This probability is chosen by user and can define how the limited a user wants to define its email community.

---
Algorithm 1 PROCESS-MAIL (Email E)
---

```
 1:  if E.F ROM is not in Contact list then
 2:      Put E in (High-Probability-Spam)
 3:  else
 4:      if E.FinalTO = M yAddress then
 5:          Put E in INBOX
 6:      else
 7:          if TTL<Threshold then
 8:              for all ContactAddress in ContactList do
 9:                  RandomVal = RANDOM-GEN01( );
10:                  if RandomVal < ForwardingProbability then
11:                      SENDMAIL(FinalTo:E.FinalTo,
                              From:MyAddress,
                              To:ContactAddress)
12:                  end if
13:              end for
14:          end if
15:      end if
16: end if
     contacts.
```

Where SENDMAIL(FinalTo, From, To) sends an email with a proper header for TO, FROM and FinalTo.

The algorithm according to the present invention may be implemented in a distributed fashion, or in a centralized fashion by emulating it in the mail server for large email providers. In one variation according to the present invention, the forwarding probability may be weighted as a function of the email traffic between a sender and the user For social networks, including dating and recreational activities, the present invention may be used to identify communities and relationship between communities using social interactions data and to find the best social connection with a group of people.

With respect to biological networks like transcription regulatory networks, the present invention may be used to discover functional blueprints of a cellular system from large-scale and high-throughput sequence and experimental data and allowing complex intracellular processes. to be revealed. See http://arxiv.org/abs/q-bio.MN/0501039). The present invention may be used to mine genomic data and other data to correlate functional and structural with sequence data, for example. Also according to the present invention, literature, patent, patient history, drug trial and other data may be mined to assist in providing diagnosis or prognosis for a disease in a patient.

Patterns and communities may be revealed by applying the present invention to homeland security data: Finding certain patterns of groups and behaviors related to homeland security, communities with certain relevant characteristics may be identified.

The present invention may be implemented with databases including relational databases, relational mappings, graph databases. For example, a wide variety of database products may be used with the present invention, such as: -MySQL by MySQL AB, Bangardsgatan 8S-753 20 UppsalaSweden: SQL from Microsoft, Richmond, Wash.; and Oracle, Oracle Corp. 500 Oracle Parkway, Redwood Shores, Calif. 94065;

Natural language processing tools may be used in conjunction with the present invention to provide, for example, text parsing. Such tools include: WebFountain: International Business Machines Corporation New Orchard Road, Armonk, N.Y.; 10504914-499-1900; Engenium,: Engenium, Dallas, Tex.; Telcordia Latent Semantic Indexing Software,: Telcordia Technologies, Inc., Piscataway, N.J.; General Text Parser: University of Tennessee Knoxville Tenn.

Also, according to the present invention, graph visualization and layout tools may be employed for improving the quality of analysis, including: aiSee: AbslntAngewandte Informatik GmbH, Stuhlsatzenhausweg 69, 66123 Saarbruecken, Germany; Prefuse: http://prefuse.sourceforge.net/ (open source—GNU written at the University of California, Berkeley and Palo Alto Research Center by Jeffrey Heer); and Jgraph,: JGraph, Ltd., http://www.jgraph.com/.

REFERENCES

[1] Bagrow, J., and Bollt, E. A Local Method for Detecting Communities. ArXiv Condensed Matter e-prints (December 2004).

[2] Bollobas, B. Random Graphs Second Edition. Cambridge University Press, United Kingdom, 2001.

[3] Boscolo, R., Rezaei, B. A., Boykin, P. O., and Roychowdhury, V. P. Functionality Encoded In Topology? Discovering Macroscopic Regulatory Modules from Large-Scale Protein-DNA Interaction Networks. Reprint arXiv: q-bio/0501039 (January 2005).

[4] Clauset, A., Newman, M. E., and Moore, C. Finding community structure in very large networks. Phys. Rev. E 70, 6 (December 2004), 066111-+.

[5] Erdos, P., and Renyi, A. On the evolution of random graphs. Publications of the Math. Inst. of the Hungarian Academy of Sc. (1960).

[6] Erdos, P., and Renyi, A. On the strength of connectedness of a random graph. Acta Mathematica Scientia Hungary 12 (1961), 261-267.

[7] Flake, G. W., Lawrence, S., Giles, C. L., and Coetzee, F. M. Self-organization and identification of web communities. Computer 35, 3 (2002), 66-71.
[8] Garton, L., Haythornthwaite, C., and Wellman, B. Studying online social networks. In Doing Internet Research, S. Jones, Ed. Sage, Thousand Oaks, Calif., 1999, pp. 75-105.
[9] Girvan, M., and Newman, M. E. J. Community structure in social and biological networks. PNAS 99, 12 (2002), 7821-7826.
[10] Latapy, M., and Pons, P. Computing communities in large networks using random walks. ArXiv Condensed Matter e-prints (December 2004).
[11] Luis, J. G.-B. Community structure of modules in the apache project.
[12] Newman, M. E. Fast algorithm for detecting community structure in networks. Phys. Rev. E 69, 6 (June 2004), 066133–+.
[13] Newman, M. E. J. Coauthorship networks and patterns of scientific collaboration. PNAS 101 (2004), 5200-5205.
[14] Pothen, A., Simon, H. D., and Liou, K.-P. Partitioning sparse matrices with eigenvectors of graphs. SIAM J. Matrix Anal. Appl. 11, 3 (1990), 430-452.
[15] Radicchi, F., Castellano, C., Cecconi, F., Loreto, V., and Parisi, D. Defining and identifying communities in networks. PNAS 101, 9 (2004), 2658-2663.
[16] Rezaei, B. A., and Roychowdhury, V. P. Percolation Crawlers: Finding webneighborhoods. preprint (2004).
[17] Rives, A. W., and Galitski, T. Modular organization of cellular networks. PNAS 100, 3 (2003), 1128-1133.
[18] Scott, J. Social Network Analysis: A Handbook, $2^{nd}$ ed. Sage Publications, London, 2000.
[19] Wasserman, S., and Faust., K. Cambridge University Press. Acta Mathematica Scientia Hungary (1994).
[20] Wellman, B., Salaff, J., Dimitrova, D., Garton, L., Gulia, M., and Haythornthwaite, C. Computer networks as a social networks: collaborative work, tele work, and virtual community. Annual Reviews Sociology 22 (1996), 213-238.
[21] Wu, F., and Huberman, B. A. Finding communities in linear time: a physics approach. European Physical Journal B 38 (2004), 331-338.
[22] Zachary, W. W. San information flow model for conflict and fission in small groups. Journal of Anthropological Research 33 (1977), 452473.
[23] Let H be a set of nodes in graph G(V,E) and let K be a proper subset of H. Let $\alpha(K)$ denote the number of edges linking members of K to V_K (the set of nodes not in K). Then H is an LS set of G if for every proper subset K of H, $\alpha(K)>\alpha(H)$. A key property of LS sets is high edge connectivity. Specifically, every node in an LS set has higher edge connectivity with other members of the LS set than with any non-member. Specifically, every node in an LS set has higher edge connectivity ($\lambda$) with other members of the LS set than with any non-member. Taking this as the sole criterion for defining a cohesive subset, a lambda set is defined as a maximal subset of nodes S such that for all a,b,c☐S and d☐V−S, $\lambda(a,b)>\lambda(c,d)$. To the extent that $\lambda$ is high, members of the same lambda set are difficult to disconnect from one another because $\lambda$ defines the number of edges that must be removed from the graph in order to disconnect the nodes within the lambda set.
[24] There are several ways of defining betweenness as described in [9] based on shortest-path or random-walks.
[25] B. W. Kernighan and S. Lin, An efficient heuristic procedure for partitioning graphs. Bell System Technical Journal 49, 291-307 (1970).

Although the present invention has been described in terms of embodiments, it is not intended that the invention be limited thereto. It is expected that further variations and improvements will occur to those skilled in the art upon consideration of the present invention, and it is intended that all such variations come within the scope of the claims.

The invention claimed is:

1. A method comprising:
  parsing patent data to generate a set of nodes;
  selecting at least one node of the set of nodes;
  determining initial links from meta data associated with the patent data for the at least one node;
  creating links among the set of nodes based on the metadata;
  identifying a set of seed nodes;
  determining a community structure for the set of seed nodes, the community structure including a plurality of communities; and
  assigning concepts to the plurality of communities,
  wherein determining the community structure comprises:
  initiating a percolation message from a source node of a linked network, the linked network comprising a plurality of nodes and a plurality of edges, each edge connecting at least two of the plurality of nodes, wherein a node is a neighbor if the node is connected to another node in the plurality of nodes by an edge, wherein the percolation message comprises a percolation probability and an identifier of the source node, and wherein initiating a percolation message from the source node comprises transmitting the percolation message to each neighbor of the source node with the percolation probability;
  propagating the percolation message through the linked network, wherein propagating the percolation message through the linked network comprises:
  transmitting the percolation message from each node that receives the percolation message to each neighbor of each node that receives the percolation message; and
  transmitting a response to the source node from each node that receives the percolation message;
  collecting each response to the percolation message at the source node; and
  storing a list of nodes that transmitted the response at the source node.

2. The method of claim 1, further comprising refining weights of the plurality of communities and modifying the community structure.

3. The method of claim 1, further comprising updating links and adding nodes to the set of nodes based on the community structure.

4. The method of claim 1, further comprising at least one of:
  finding a patent landscape from the community structure;
  identifying the patent landscape based on different node types and identifying gaps in the patent landscape;
  monitoring the patent landscape over time; and
  monitoring the patent landscape for competitors.

5. The method of claim 1, wherein the initial links are selected from the group consisting of links between patents, links between inventors, links between examiners, links between authors, links between corporations, and links to papers.

6. The method of claim 1, further comprising adding semantic links between papers and patents.

7. The method of claim 1, further comprising producing a report based on user requirements.

8. The method of claim 7, further comprising modifying the report by user input.

9. The method of claim 8, wherein the user input comprises Boolean filters.

10. The method of claim 1, wherein the set of seed nodes is selected from the group consisting of keywords, description, related patent numbers, a company, a person, prior art and topic.

11. A method comprising:
parsing patent data to generate a set of nodes;
selecting at least one node of the set of nodes;
determining initial links from metadata associated with the patent data for the at least one node;
creating links among the set of nodes based on the metadata;
identifying a set of seed nodes;
determining a community structure for the set of seed nodes, the community structure including a plurality of communities; and
assigning concepts to the plurality of communities,
wherein determining the community structure comprises:
initiating a plurality of percolation messages from each of a plurality of source nodes at a plurality of percolation probabilities, wherein the plurality of percolation probabilities are selected from a set of values between 0 and 1;
determining a list of nodes that received the plurality of percolation messages for each of the plurality of source nodes;
aggregating the list of nodes for each of the plurality of source nodes to determine a local neighborhood for each of the plurality of source nodes, wherein each node is weighted based on a number of times each node received the plurality of percolation messages;
plotting the local neighborhood size versus percolation probabilities for each of the local neighborhoods in a plot;
locating phase transition points in the plot; and
determining nested local communities for the plurality of source nodes by combining the local neighborhoods at the phase transition points.

12. The method of claim 1 further comprising:
specifying a weight for each link; and
determining a weight for each of the plurality of communities.

13. The method of claim 12, further comprising modifying the weight for each link, and determining a modified weight for each of the plurality of communities.

14. The method of claim 1 further comprising:
specifying a weight for each node; and
determining a weight for each of the plurality of communities.

15. The method of claim 14, further comprising modifying the weight for each node, and determining a modified weight for each of the plurality of communities.

16. A non-transitory program storage device readable by a machine, embodying a program of instructions executable by the machine to perform a method, the method comprising:
parsing patent data to generate a set of nodes;
selecting at least one node of the set of nodes;
determining initial links from meta data associated with the patent data for the at least one node;
creating links among the set of nodes based on the metadata;
identifying a set of seed nodes;
determining a community structure for the set of seed nodes, the community structure including a plurality of communities; and
assigning concepts to the plurality of communities,
wherein determining the community structure comprises:
initiating a percolation message from a source node of a linked network, the linked network comprising a plurality of nodes and a plurality of edges, each edge connecting at least two of the plurality of nodes, wherein a node is a neighbor if the node is connected to another node in the plurality of nodes by an edge, wherein the percolation message comprises a percolation probability and an identifier of the source node, and wherein initiating a percolation message from the source node comprises transmitting the percolation message to each neighbor of the source node with the percolation probability;
propagating the percolation message through the linked network, wherein propagating the percolation message through the linked network comprises:
transmitting the percolation message from each node that receives the percolation message to each neighbor of each node that receives the percolation message; and
transmitting a response to the source node from each node that receives the percolation message;
collecting each response to the percolation message at the source node; and
storing a list of nodes that transmitted the response at the source node.

17. The program storage device of claim 16, further comprising refining weights of the plurality of communities and modifying the community structure.

18. The program storage device of claim 16, further comprising updating links and adding nodes to the set of nodes based on the community structure.

19. The program storage device of claim 16, further comprising at least one of:
finding a patent landscape from the community structure;
identifying the patent landscape based on different node types and identifying gaps in the patent landscape;
monitoring the patent landscape over time; and
monitoring the patent landscape for competitors.

20. The program storage device of claim 16, wherein the initial links are selected from the group consisting of links between patents, links between inventors, links between examiners, links between authors, links between corporations, and links to papers.

21. The program storage device of claim 16, further comprising adding semantic links between papers and patents.

22. The program storage device of claim 16, further comprising producing a report based on user requirements.

23. The program storage device of claim 22, further comprising modifying the report by user input.

24. The program storage device of claim 23, wherein the user input comprises Boolean filters.

25. The program storage device of claim 16, wherein the set of seed nodes is selected from the group consisting of keywords, description, related patent numbers, a company, a person, prior art and topic.

26. A non-transitory program device readable by a machine, embodying a program of instructions executable by the machine to perform a method, the method comprising:
parsing patent data to generate a set of nodes;
selecting at least one node of the set of nodes;

determining initial links from meta data associated with the patent data for the at least one node;
creating links among the set of nodes based on the metadata;
identifying a set of seed nodes;
determining a community structure for the set of seed nodes, the community structure including a plurality of communities; and
assigning concepts to the plurality of communities,
wherein determining the community structure comprises:
   initiating a plurality of percolation messages from each of a plurality of source nodes at a plurality of percolation probabilities, wherein the plurality of percolation probabilities are selected from a set of values between 0 and 1;
   determining a list of nodes that received the plurality of percolation messages for each of the plurality of source nodes;
   aggregating the list of nodes for each of the plurality of source nodes to determine a local neighborhood for each of the plurality of source nodes, wherein each node is weighted based on a number of times each node received the plurality of percolation messages;
   plotting the local neighborhood size versus percolation probabilities for each of the local neighborhoods in a plot;
   locating phase transition points in the plot; and
   determining nested local communities for the plurality of source nodes by combining the local neighborhoods at the phase transition points.

27. The program storage device of claim 16 further comprising:
specifying a weight for each link; and
determining a weight for each of the plurality of communities.

28. The program storage device of claim 27, further comprising modifying the weight for each link, and determining a modified weight for each of the plurality of communities.

29. The program storage device of claim 16 further comprising:
specifying a weight for each node; and
determining a weight for each of the plurality of communities.

30. The program storage device of claim 29, further comprising modifying the weight for each node, and determining a modified weight for each of the plurality of communities.

31. An apparatus comprising:
memory;
one or more computers configured to:
   parse patent data to generate a set of nodes;
   select at least one node of the set of nodes;
   determine initial links from meta data associated with the patent data for the at least one node;
   create links among the set of nodes based on the metadata;
   identify a set of seed nodes;
   determine a community structure for the set of seed nodes, the community structure including a plurality of communities; and
   assign concepts to the plurality of communities,
   wherein determining the community structure comprises:
      initiating a percolation message from a source node of a linked network, the linked network comprising a plurality of nodes and a plurality of edges, each edge connecting at least two of the plurality of nodes, wherein a node is a neighbor if the node is connected to another node in the plurality of nodes by an edge, wherein the percolation message comprises a percolation probability and an identifier of the source node, and wherein initiating a percolation message from the source node comprises transmitting the percolation message to each neighbor of the source node with the percolation probability;
      propagating the percolation message through the linked network, wherein propagating the percolation message through the linked network comprises:
         transmitting the percolation message from each node that receives the percolation message to each neighbor of each node that receives the percolation message; and
         transmitting a response to the source node from each node that receives the percolation message;
      collecting each response to the percolation message at the source node; and
      storing a list of nodes that transmitted the response at the source node.

32. The apparatus of claim 31, wherein the one or more computers are further configured to refine weights of the plurality of communities and modifying the community structure.

33. The apparatus of claim 31, wherein the one or more computers are further configured to update links and add nodes to the set of nodes based on the community structure.

34. The apparatus of claim 31, wherein the one or more computers are further configured to:
find a patent landscape from the community structure;
identify the patent landscape based on different node types and identifying gaps in the patent landscape;
monitor the patent landscape over time; and
monitor the patent landscape for competitors.

35. The apparatus of claim 31, wherein the initial links are selected from the group consisting of links between patents, links between inventors, links between examiners, links between authors, links between corporations, and links to papers.

36. The apparatus of claim 31, wherein the one or more computers are further configured to add semantic links between papers and patents.

37. The apparatus of claim 31, wherein the one or more computers are further configured to produce a report based on user requirements.

38. The apparatus of claim 37, wherein the one or more computers are further configured to modify the report by user input.

39. The apparatus of claim 38, wherein the user input comprises Boolean filters.

40. The apparatus of claim 31, wherein the set of seed nodes is selected from the group consisting of keywords, description, related patent numbers, a company, a person, prior art and topic.

41. An apparatus comprising:
memory;
one or more computers configured to:
parse patent data to generate a set of nodes;
select at least one node of the set of nodes;
determine initial links from meta data associated with the patent data for the at least one node;
create links among the set of nodes based on the metadata;
identify a set of seed nodes;

determine a community structure for the set of seed nodes, the community structure including a plurality of communities; and
assign concepts to the plurality of communities,
wherein determining the community structure comprises:
    initiating a plurality of percolation messages from each of a plurality of source nodes at a plurality of percolation probabilities, wherein the plurality of percolation probabilities are selected from a set of values between 0 and 1;
    determining a list of nodes that received the plurality of percolation messages for each of the plurality of source nodes;
    aggregating the list of nodes for each of the plurality of source nodes to determine a local neighborhood for each of the plurality of source nodes, wherein each node is weighted based on a number of times each node received the plurality of percolation messages;
    plotting the local neighborhood size versus percolation probabilities for each of the local neighborhoods in a plot;
    locating phase transition points in the plot; and
    determining nested local communities for the plurality of source nodes by combining the local neighborhoods at the phase transition points.

42. The apparatus of claim 31 wherein the one or more computers are further configured to:
    specify a weight for each link; and
    determine a weight for each of the plurality of communities.

43. The apparatus of claim 42, wherein the one or more computers are further configured to modify the weight for each link, and determine a modified weight for each of the plurality of communities.

44. The apparatus of claim 31 wherein the one or more computers are further configured to:
    specify a weight for each node; and
    determine a weight for each of the plurality of communities.

45. The apparatus of claim 44, wherein the one or more computers are further configured to modify the weight for each node, and determine a modified weight for each of the plurality of communities.

46. An apparatus comprising:
    means for parsing patent data to generate a set of nodes;
    means for selecting at least one node of the set of nodes;
    means for determining initial links from meta data associated with the patent data for the at least one node;
    means for creating links among the set of nodes based on the metadata;
    means for identifying a set of seed nodes;
    means for determining a community structure for the set of seed nodes, the community structure including a plurality of communities; and
    means for assigning concepts to the plurality of communities,
    wherein the means for determining the community structure comprises:
        means for initiating a percolation message from a source node of a linked network, the linked network comprising a plurality of nodes and a plurality of edges, each edge connecting at least two of the plurality of nodes, wherein a node is a neighbor if the node is connected to another node in the plurality of nodes by an edge, wherein the percolation message comprises a percolation probability and an identifier of the source node, and wherein initiating a percolation message from the source node comprises transmitting the percolation message to each neighbor of the source node with the percolation probability;
        means for propagating the percolation message through the linked network, wherein propagating the percolation message through the linked network comprises:
            means for transmitting the percolation message from each node that receives the percolation message to each neighbor of each node that receives the percolation message; and
            means for transmitting a response to the source node from each node that receives the percolation message;
        means for collecting each response to the percolation message at the source node; and
        means for storing a list of nodes that transmitted the response at the source node.

47. The apparatus of claim 46, further comprising means for refining weights of the plurality of communities and modifying the community structure.

48. The apparatus of claim 46, further comprising means for updating links and adding nodes to the set of nodes based on the community structure.

49. The apparatus of claim 46, further comprising at least one of:
    means for finding a patent landscape from the community structure;
    means for identifying the patent landscape based on different node types and identifying gaps in the patent landscape;
    means for monitoring the patent landscape over time; and
    means for monitoring the patent landscape for competitors.

50. The apparatus of claim 46, wherein the initial links are selected from the group consisting of links between patents, links between inventors, links between examiners, links between authors, links between corporations, and links to papers.

51. The apparatus of claim 46, further comprising means for adding semantic links between papers and patents.

52. The apparatus of claim 46, further comprising means for producing a report based on user requirements.

53. The apparatus of claim 52, further comprising means for modifying the report by user input.

54. The apparatus of claim 53, wherein the user input comprises Boolean filters.

55. The apparatus of claim 46, wherein the set of seed nodes is selected from the group consisting of keywords, description, related patent numbers, a company, a person, prior art and topic.

56. An apparatus comprising:
    means for parsing patent data to generate a set of nodes;
    means for selecting at least one node of the set of nodes;
    means for determining initial links from meta data associated with the patent data for the at least one node;
    means for creating links among the set of nodes based on the metadata;
    means for identifying a set of seed nodes;
    means for determining a community structure for the set of seed nodes, the community structure including a plurality of communities; and
    means for assigning concepts to the plurality of communities,
    wherein determining the community structure comprises:
        means for initiating a plurality of percolation messages from each of a plurality of source nodes at a plurality of percolation probabilities, wherein the plurality of percolation probabilities are selected from a set of values between 0 and 1;

means for determining a list of nodes that received the plurality of percolation messages for each of the plurality of source nodes;

means for aggregating the list of nodes for each of the plurality of source nodes to determine a local neighborhood for each of the plurality of source nodes, wherein each node is weighted based on a number of times each node received the plurality of percolation messages;

means for plotting the local neighborhood size versus percolation probabilities for each of the local neighborhoods in a plot;

means for locating phase transition points in the plot; and means for determining nested local communities for the plurality of source nodes by combining the local neighborhoods at the phase transition points.

57. The apparatus of claim 46 further comprising:

means for specifying a weight for each link; and means for determining a weight for each of the plurality of communities.

58. The apparatus of claim 57, further comprising means for modifying the weight for each link, and means for determining a modified weight for each of the plurality of communities.

59. The method of claim 46 further comprising:

means for specifying a weight for each node; and means for determining a weight for each of the plurality of communities.

60. The apparatus of claim 59, further comprising means for modifying the weight for each node, and means for determining a modified weight for each of the plurality of communities.

* * * * *